United States Patent
Choi et al.

(10) Patent No.: US 10,985,946 B2
(45) Date of Patent: Apr. 20, 2021

(54) METHOD FOR TRANSMITTING SRS, AND MOBILE TERMINAL FOR THE SAME

(71) Applicant: LG Electronics Inc., Seoul (KR)

(72) Inventors: Kukheon Choi, Seoul (KR); Jiwon Kang, Seoul f (KR); Jonghyun Park, Seoul (KR); Kyuseok Kim, Seoul (KR); Minki Ahn, Seoul (KR); Kilbom Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/064,965

(22) PCT Filed: Apr. 27, 2018

(86) PCT No.: PCT/KR2018/004946
§ 371 (c)(1),
(2) Date: Jun. 21, 2018

(87) PCT Pub. No.: WO2018/199696
PCT Pub. Date: Nov. 1, 2018

(65) Prior Publication Data
US 2020/0295973 A1    Sep. 17, 2020

Related U.S. Application Data

(60) Provisional application No. 62/490,614, filed on Apr. 27, 2017.

(51) Int. Cl.
*H04L 25/02*    (2006.01)
*H04B 1/713*    (2011.01)
(Continued)

(52) U.S. Cl.
CPC ......... *H04L 25/0226* (2013.01); *H04B 1/713* (2013.01); *H04B 1/7143* (2013.01);
(Continued)

(58) Field of Classification Search
None
See application file for complete search history.

(56) References Cited

U.S. PATENT DOCUMENTS

2011/0261716 A1    10/2011    Kim et al.
2015/0009951 A1*    1/2015    Josiam ................. H04L 5/0051
                                                                370/330
(Continued)

FOREIGN PATENT DOCUMENTS

JP         2020509630         3/2020
KR      1020110133448        12/2011
(Continued)

OTHER PUBLICATIONS

U.S. Notice of Allowance in U.S. Appl. No. 16/209,541, dated Feb. 13, 2019, 9 pages.
(Continued)

*Primary Examiner* — Otis L Thompson, Jr.
(74) *Attorney, Agent, or Firm* — Fish & Richardson P.C.

(57) ABSTRACT

A method of transmitting a sounding reference symbol (SRS) at a user equipment (UE) includes receiving, from a base station, first information including information on at least one predetermined SRS sequence parameter configured in association with a frequency hopping pattern among SRS sequence parameters, generating an SRS sequence using a value of a parameter corresponding to a frequency hopping pattern configured in the UE with respect to the at least one predetermined SRS sequence parameter, and transmitting the SRS, to which the generated SRS sequence is applied, to the base station through SRS resources.

12 Claims, 30 Drawing Sheets

(a) SRS BW AND RF BW CAPABILITY OF CERTAIN UE (b) EXAMPLE OF SYMBOL RETUNING IN CAPABILITY OF (a)

(51) Int. Cl.
| | |
|---|---|
| *H04L 5/00* | (2006.01) |
| *H04L 27/26* | (2006.01) |
| *H04W 76/27* | (2018.01) |
| *H04W 72/04* | (2009.01) |
| *H04B 7/06* | (2006.01) |
| *H04W 88/02* | (2009.01) |
| *H04L 1/00* | (2006.01) |
| *H04B 1/7143* | (2011.01) |

(52) U.S. Cl.
CPC ............ *H04B 7/0617* (2013.01); *H04L 1/00* (2013.01); *H04L 5/00* (2013.01); *H04L 5/001* (2013.01); *H04L 5/0012* (2013.01); *H04L 5/0048* (2013.01); *H04L 5/0051* (2013.01); *H04L 5/0083* (2013.01); *H04L 5/0091* (2013.01); *H04L 27/2605* (2013.01); *H04L 27/2607* (2013.01); *H04L 27/2613* (2013.01); *H04W 72/04* (2013.01); *H04W 72/042* (2013.01); *H04W 72/0446* (2013.01); *H04W 72/0453* (2013.01); *H04W 76/27* (2018.02); *H04W 88/02* (2013.01); *H04L 5/0023* (2013.01); *H04L 5/0064* (2013.01)

(56) References Cited

U.S. PATENT DOCUMENTS

| | | | |
|---|---|---|---|
| 2015/0229450 | A1 | 8/2015 | Noh |
| 2016/0037567 | A1* | 2/2016 | Lei ................. H04L 1/1671 370/329 |
| 2017/0048717 | A1 | 2/2017 | Yoo et al. |
| 2017/0251497 | A1 | 8/2017 | Larsson et al. |
| 2018/0206132 | A1* | 7/2018 | Guo .................. H04B 7/02 |
| 2018/0279239 | A1 | 9/2018 | Si et al. |
| 2019/0158244 | A1* | 5/2019 | Shin .................. H04L 5/0098 |
| 2019/0319692 | A1* | 10/2019 | Noh .................. H04L 5/0053 |
| 2020/0213161 | A1* | 7/2020 | Zhang .................. H04B 1/713 |
| 2020/0228213 | A1* | 7/2020 | Masal .................. H04W 72/082 |
| 2020/0259683 | A1* | 8/2020 | Manolakos ......... H04L 25/0226 |
| 2020/0280404 | A1* | 9/2020 | Qin .................. H04L 5/00 |
| 2020/0287684 | A1* | 9/2020 | Shin .................. H04L 5/0007 |
| 2020/0313932 | A1* | 10/2020 | Sun .................. H04L 27/2605 |

FOREIGN PATENT DOCUMENTS

| | | |
|---|---|---|
| KR | 101250896 | 4/2013 |
| KR | 101488234 | 1/2015 |
| KR | 101527018 | 6/2015 |
| KR | 1020160087370 | 7/2016 |
| KR | 101647868 | 8/2016 |
| KR | 1020160143657 | 12/2016 |
| KR | 1020170020285 | 2/2017 |
| RU | 2485708 | 3/2013 |
| WO | WO2016163805 | 10/2016 |

OTHER PUBLICATIONS

Korean Notice of Allowance in Korean Appln. No. 10-2018-7019462, dated Mar. 15, 2019, 3 pages (with English translation).
Huawei, HiSilicon, "Multiplexing of UL control channel and SRS in NR", R1-1701649, 3GPP TSG RAN WG1 Meeting #88, Athens, Greece, Feb. 13-17, 2017, 3 pages.
LG Electronics, "Details on SR repetition and SRS transmission for MTC UE", R1-154239, 3GPP TSG RAN WG1 Meeting #82, Beijing, China, Aug. 24-28, 2015, 5 pages.
"5G; Study on New Radio (NR) access technology (3GPP TR 38.912 version 14.0.0 Release 14)", ETSI TR 138 912 V14.0.0 (May 2017), 77 pages.
"3rd Generation Partnership Project; Technical Specification Group Radio Access Network; Evolved Universal Terrestrial Radio Access (E-UTRA); Physical Channels and Modulation (Release 8)", 3GPP TS 36.211 V8.3.0 (May 2008), 77 pages.
"3rd Generation Partnership Project; Technical Specification Group Radio Access Network; Evolved Universal Terrestrial Radio Access (E-UTRA); Physical channels and modulation (Release 13)", 3GPP TS 36.211 V13.1.0 (Mar. 2016), 155 pages.
Huawei, HiSilicon, "Principles for Reference Signal Design and QCL Assumptions for NR", R1-167224, 3GPP TSG WG1 Meeting #86, Gothenburg, Sweden, Aug. 22-26, 2016, 9 pages.
Huawei et al., "UL SRS design for CSI acquisition and beam management," 3GPP TSG RAN WG1 Meeting #88, dated Feb. 13-17, 2017, 10 pages.
Ericsson, "On SRS design," R1-1703222, 3GPP TSG-RAN WG1 #88, Athens, Greece, dated Feb. 13-17, 2017, 9 pages, XP051210355.
Extended European Search Report in European Application No. 18790944.5, dated Jul. 27, 2020, 12 pages.
Sharp, "Simulation Results for Multi-shot Dynamic Aperiodic SRS," R1-106097, 3GPP TSG RAN WG1 Meeting #63, Jacksonville, USA, dated Nov. 15-19, 2010, 8 pages, XP050466868.
ZTE, Sanechips, "Discussion on SRS design for NR," R1-1717435, 3GPP TSG RAN WG1 Meeting 90bis, Prague, CZ, dated Oct. 9-13, 2017, 9 pages, XP051340624.
Russian Notice of Allowance in Russian Application No. 2019114467, dated Feb. 18, 2020, 20 pages (with English translation).
Samsung, "SRS design for NR," R1-1702960, 3GPP TSG RAN WG1 Meeting #88, Athens, Greece, dated Feb. 13-17, 2017, 4 pages.
Ericsson, "SRS design," R1-1700769, 3GPP TSG-RAN WG1 #87ah-NR, Spokane, WA, USA, dated Jan. 16-20, 2017, 7 pages.
Korean Notice of Allowance in Korean Application No. 10-2019-7017302, dated Apr. 2, 2020, 4 pages (with English translation).

* cited by examiner

FIG. 8
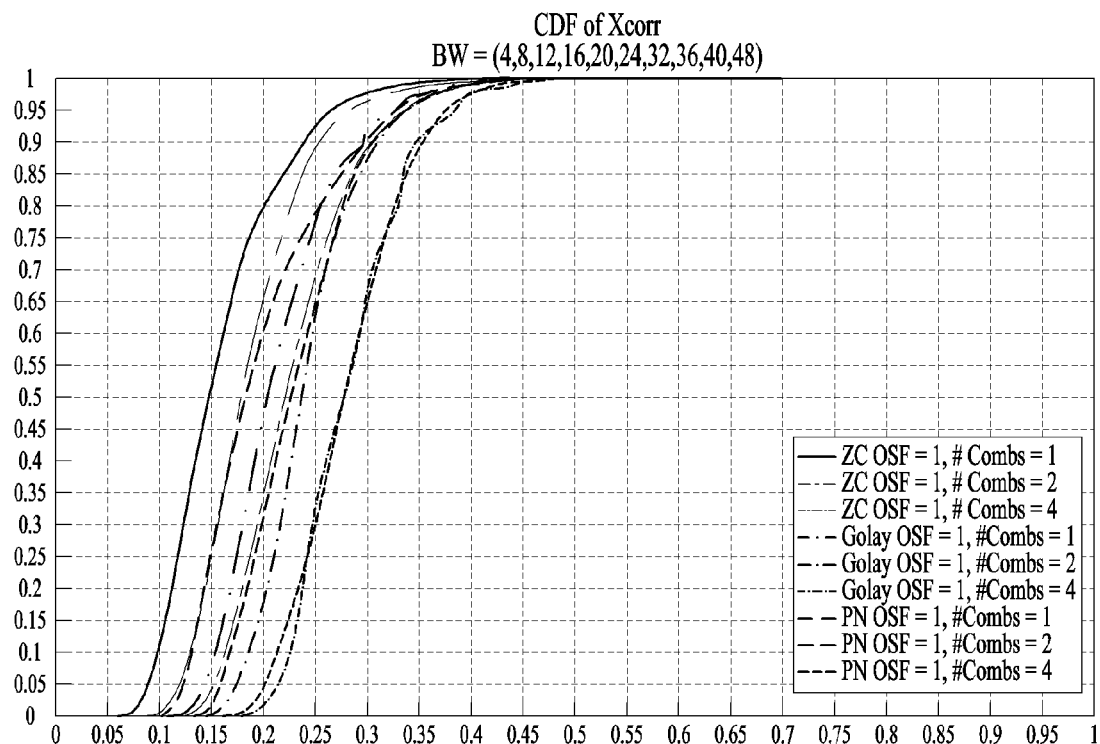
(a) CROSS-CORRELATION EVALUATION
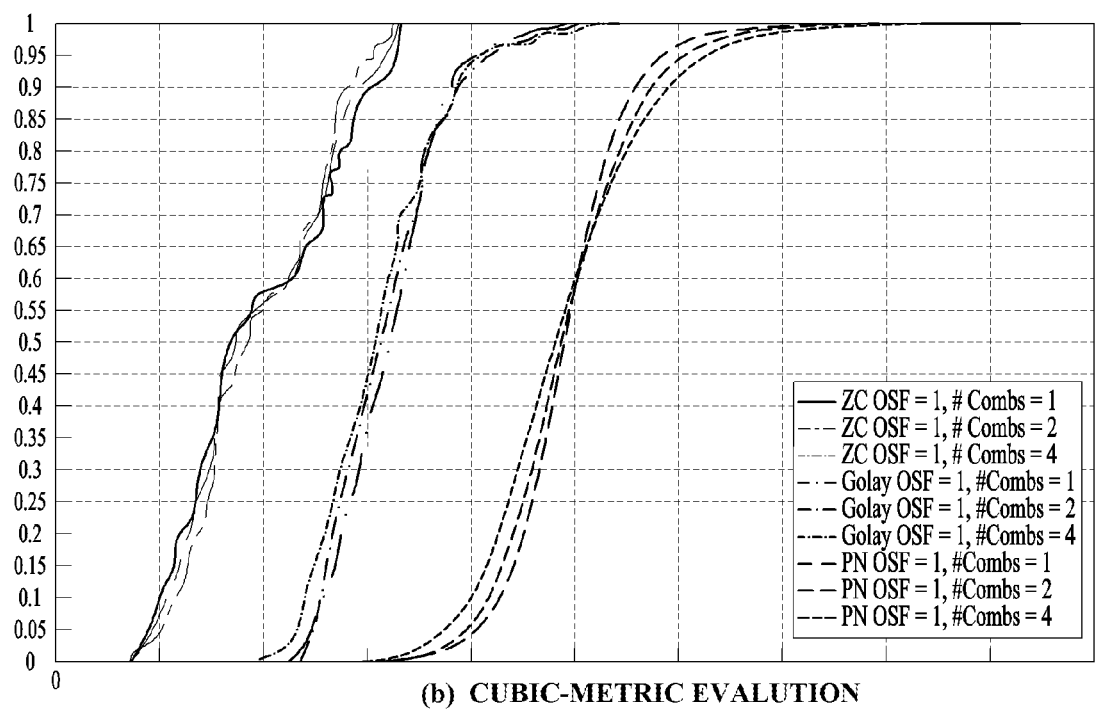
(b) CUBIC-METRIC EVALUTION FIG. 10
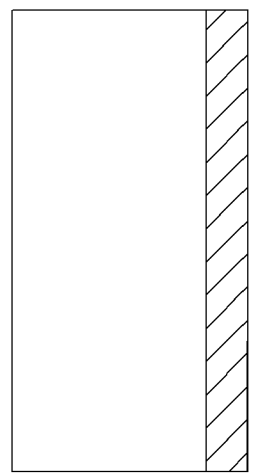  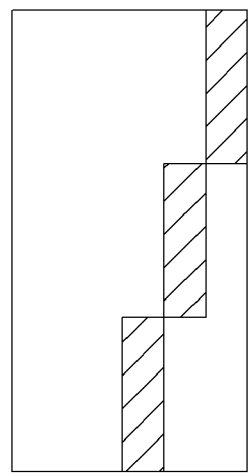
ONE SYMBOL UL BW SRS CONFIGURATION
MULTI SYMBOL UL BW SRS CONFIGURATION WITH HOPPING

FIG. 30
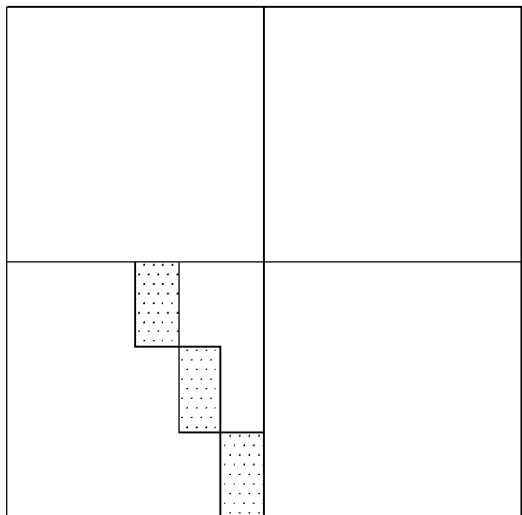
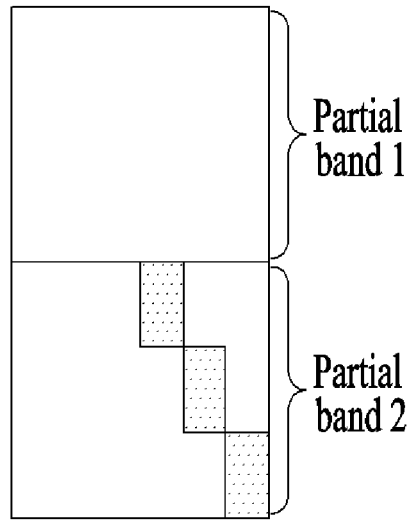
(a) fixed symbol-level hopping pattern
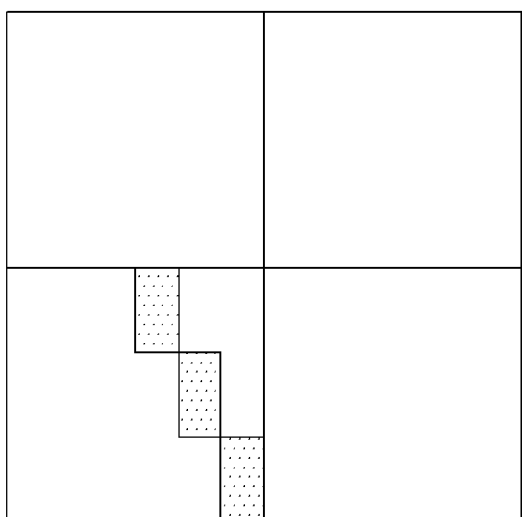
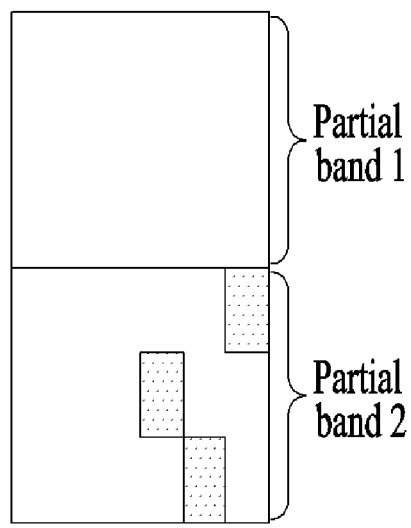
(b) different symbol-level hopping patterns

METHOD FOR TRANSMITTING SRS, AND MOBILE TERMINAL FOR THE SAME

CROSS-REFERENCE TO RELATED APPLICATIONS

This application is a National Stage application under 35 U.S.C. § 371 of International Application No. PCT/KR2018/004946, filed on Apr. 27, 2018, which claims the benefit of U.S. Provisional Application No. 62/490,614, filed on Apr. 27, 2017. The disclosures of the prior applications are incorporated by reference in their entirety.

TECHNICAL FIELD

The present invention relates to wireless communication and, more particularly, to a method of transmitting a sounding reference symbol (SRS) and a user equipment (UE) therefor.

BACKGROUND ART

When a new radio access technology (RAT) system is introduced, as more and more communication devices require larger communication capacity, there is a need for improved mobile broadband communication as compared to existing RAT.

In addition, massive machine type communications (MTC) connected to a plurality of devices and things to provide various services anytime and anywhere is one of main issues to be considered in next-generation communication. In addition, communication system design considering services/UEs sensitive to reliability and latency has been discussed. As such, New RAT will provide services considering enhanced mobile broadband communication (eMBB), massive MTC (mMTC), URLLC (Ultra-Reliable Low-Latency Communication), etc. In a next-generation 5G system, scenarios may be divided into Enhanced Mobile BroadBand (eMBB)/Ultra-reliable Machine-Type Communications (uMTC)/Massive Machine-Type Communications (mMTC), etc. eMBB is a next-generation mobile communication scenario having high spectrum efficiency, high user experienced data rate, high peak data rate, etc., uMTC is a next-generation mobile communication scenario having ultra-reliability, ultra-low latency, ultra-high availability, etc. (e.g., V2X, emergency service, remote control), and mMTC is a next-generation mobile communication scenario having low cost, low energy, short packet, and massive connectivity (e.g., IoT).

DISCLOSURE

Technical Problem

An object of the present invention is to provide a method of transmitting an SRS.

Another object of the present invention is to provide a user equipment (UE) for transmitting an SRS.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The object of the present invention can be achieved by providing a method of transmitting a sounding reference symbol (SRS) by a user equipment (UE) including receiving, from a base station, first information including information on at least one predetermined SRS sequence parameter configured interlocked with a frequency hopping pattern among SRS sequence parameters, generating an SRS sequence using a value of a parameter corresponding to a frequency hopping pattern configured in the UE with respect to the at least one predetermined SRS sequence parameter, and transmitting the SRS, to which the generated SRS sequence is applied, to the base station through SRS resources.

The method may further include receiving second information including information indicating the value of the parameter corresponding to the frequency hopping pattern configured for the UE with respect to the at least one predetermined SRS sequence parameter. The value of the parameter corresponding to the frequency hopping pattern configured in the UE may be set to a value varying according to the frequency hopping pattern. The second information may be received in a downlink control information (DCI) format.

The information on the at least one predetermined SRS sequence parameter may include a value of the at least one SRS sequence parameter. Frequency hopping may be configured at a slot level with respect to the UE. The first information may be received through an radio resource control (RRC) signaling. The SRS resource may include one or more symbols.

In another aspect of the present invention, provided herein is a user equipment (UE) for transmitting a sounding reference symbol (SRS) including a receiver configured to receive, from a base station, first information including information on at least one predetermined SRS sequence parameter configured interlocked with a frequency hopping pattern among SRS sequence parameters, a processor configured to generate an SRS sequence using a value of a parameter corresponding to a frequency hopping pattern configured in the UE with respect to the at least one predetermined SRS sequence parameter, and a transmitter configured to transmit the SRS, to which the generated SRS sequence is applied, through SRS resources.

The receiver may be configured to further receive second information including information indicating the value of the parameter corresponding to the frequency hopping pattern configured in the UE with respect to the at least one predetermined SRS sequence parameter. The information on the at least one predetermined SRS sequence parameter may include a value of the at least one SRS sequence parameter. The value of the parameter corresponding to the frequency hopping pattern configured in the UE may be set to a value varying according to the frequency hopping pattern. Frequency hopping may be configured at a slot level with respect to the UE. The receiver may receive the first information through an radio resource control (RRC) signaling. The receiver may receive the second information in a downlink control information (DCI) format.

Advantageous Effects

According to the embodiment of the present invention, if UL full-band sounding is requested at the time of NR SRS transmission, UEs (e.g., cell-edge UEs), which cannot perform UL full-band transmission due to limitation of UE's link budget, can perform UL full-band sounding while subband sounding hops on multiple symbols or multiple slots.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. In the drawings:

FIG. 8 is a view showing cross-correlation and cubic-metric evaluations of ZC, Golay and PN sequences.

FIG. 10 illustrates multi-symbol SRS triggering for uplink beam management;

FIG. 30 is a view showing description of Case 3;

BEST MODE

Figure 1:
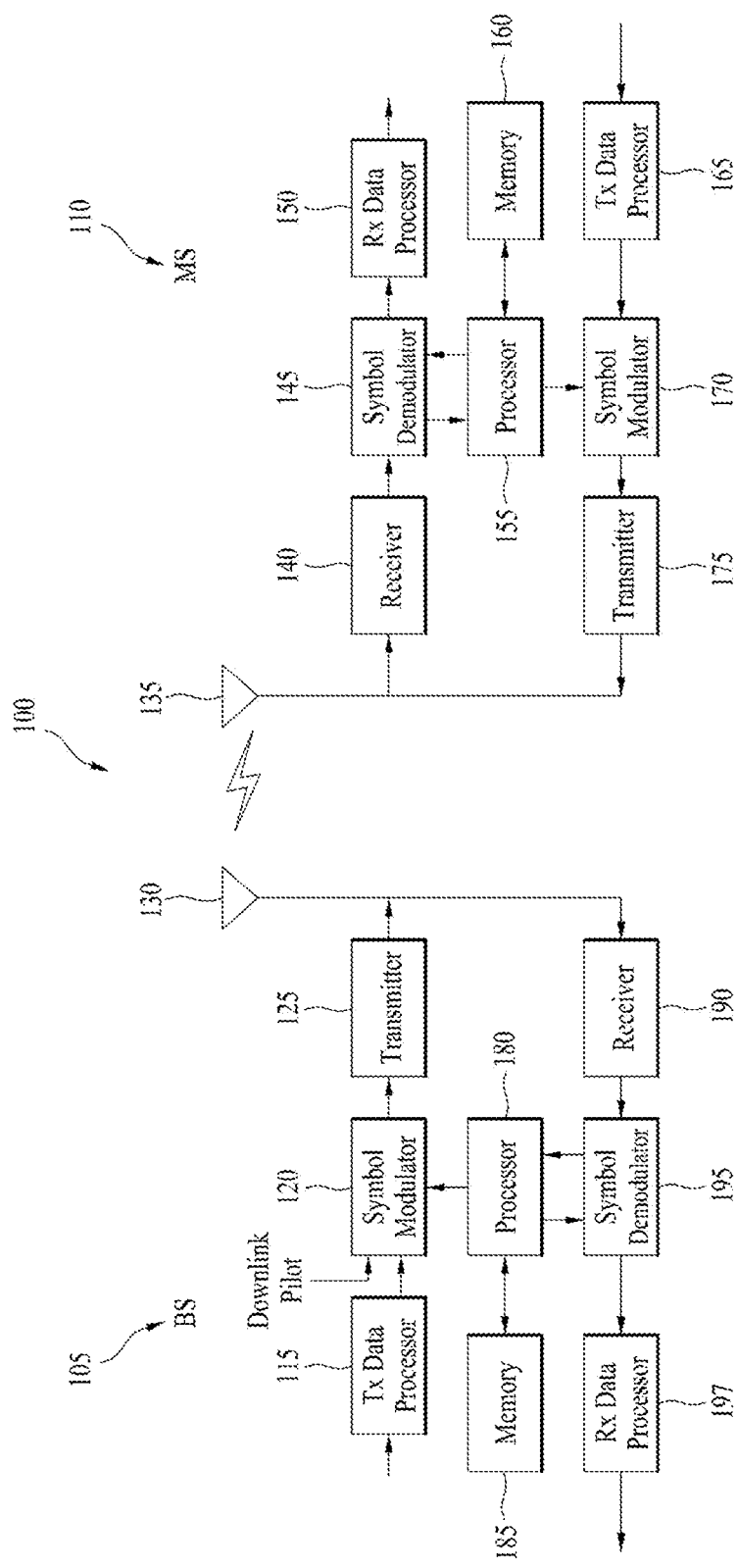
FIG. 1 is a block diagram showing the configuration of a base station (BS) 105 and a user equipment (UE) 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP), gNode B and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the base station 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention.

And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

First, SRS transmission in a 3GPP LTE/LTE-A system will be described in Table 1 below.

TABLE 1

A UE shall transmit Sounding Reference Symbol (SRS) on per serving cell SRS
resources based on two trigger types:
trigger type 0: higher layer signalling
trigger type 1: DCI formats 0/4/1A for FDD and TDD and DCI formats 2B/2C/2D for TDD.
In case both trigger type 0 and trigger type 1 SRS transmissions would occur in the
same subframe in the same serving cell, the UE shall only transmit the trigger type 1
SRS transmission.
A UE may be configured with SRS parameters for trigger type 0 and trigger type 1 on
each serving cell. The following SRS parameters are serving cell specific and
semi-statically configurable by higher layers for trigger type 0 and for trigger type 1.
Transmission comb $\bar{k}_{TC}$, as defined in subclause 5.5.3.2 of [3] for trigger type 0
and each configuration of trigger type 1
Starting physical resource block assignment $n_{RRC}$, as defined in subclause 5.5.3.2 of
[3] for trigger type 0 and each configuration of trigger type 1
duration: single or indefinite (until disabled), as defined in [11] for trigger type 0
srs-ConfigIndex $I_{SRS}$ for SRS periodicity $T_{SRS}$ and SRS subframe offset $T_{offset}$, as
defined in Table 8.2-1 and Table 8.2-2 for trigger type 0 and SRS periodicity
$T_{SRS,1}$, and SRS subframe offset $T_{SRS,1}$, as defined in Table 8.2-4 and Table 8.2-5 trigger type 1
SRS bandwidth $B_{SRS}$, as defined in subclause 5.5.3.2 of [3] for trigger type 0 and
each configuration of trigger type 1
Frequency hopping bandwidth, $b_{hop}$, as defined in subclause 5.5.3.2 of [3] for trigger type 0
Cyclic shift $n_{SRS}^{cs}$, as defined in subclause 5.5.3.1 of [3] for trigger type 0 and each
configuration of trigger type 1
Number of antenna ports $N_p$ for trigger type 0 and each configuration of trigger type 1
For trigger type 1 and DCI format 4 three sets of SRS parameters, srs-ConfigApDCI-Format4,
are configured by higher layer signalling. The 2-bit SRS request field [4] in
DCI format 4 indicates the SRS parameter set given in Table 8.1-1. For trigger type 1
and DCI format 0, a single set of SRS parameters, srs-ConfigApDCI-Format0, is
configured by higher layer signalling. For trigger type 1 and DCI formats 1A/2B/2C/2D,
a single common set of SRS parameters, srs-ConfigApDCI-Format1a2b2c,
is configured by higher layer signalling. The SRS request field is 1 bit
[4] for DCI formats 0/1A/2B/2C/2D, with a type 1 SRS triggered if the value of the
SRS request field is set to '1'.
A 1-bit SRS request field shall be included in DCI formats 0/1A for frame structure
type 1 and 0/1A/2B/2C/2D for frame structure type 2 if the UE is configured with SRS
parameters for DCI formats 0/1A/2B/2C/2D by higher-layer signalling.

Table 2 below shows an SRS request value for trigger type 1 in DCI format 4 in a 3GPP LTE/LTE-A system.

TABLE 2

| Value of SRS request field | Description |
| --- | --- |
| '00' | No type 1 SRS trigger |
| '01' | The 1$^{st}$ SRS parameter set configured by higher layers |

TABLE 2-continued

| Value of SRS request field | Description |
| --- | --- |
| '10' | The 2$^{nd}$ SRS parameter set configured by higher layers |
| '11' | The 3$^{rd}$ SRS parameter set configured by higher layers |

Table 3 below further describes additions related to SRS transmission in a 3GPP LTE/LTE-A system.

TABLE 3

The serving cell specific SRS transmission bandwidths CSRS are configured by higher layers. The allowable values are given in subclause 5.5.3.2 of [3].
The serving cell specific SRS transmission sub-frames are configured by higher layers. The allowable values are given in subclause 5.5.3.3 of [3].
For a TDD serving cell, SRS transmissions can occur in UpPTS and uplink subframes of the UL/DL configuration indicated by the higher layer parameter subframeAssignment for the serving cell.
When closed-loop UE transmit antenna selection is enabled for a given serving cell for a UE that supports transmit antenna selection, the index $a(n_{SRS})$, of the UE antenna that transmits the SRS at time $n_{SRS}$ is given by
$a(n_{SRS}) = n_{SRS}$ mod 2, for both partial and full sounding bandwidth, and when frequency hopping is disabled (i.e., $b_{hop} \geq B_{SRS}$), $$a(n_{SRS}) = \begin{cases} (n_{SRS} + \lfloor n_{SRS}/2 \rfloor + \beta \cdot \lfloor n_{SRS}/K \rfloor) \bmod 2 & \text{when } K \text{ is even} \\ n_{SRS} \bmod 2 & \text{when } K \text{ is odd} \end{cases},$$

$$\beta = \begin{cases} 1 & \text{where } K \bmod 4 = 0 \\ 0 & \text{otherwise} \end{cases}$$

when frequency hopping is enabled (i.e. $b_{hop} < B_{SRS}$),
where values $B_{SRS}$, $b_{hop}$, $N_b$, and $n_{SRS}$ are given in subclause 5.5.3.2 of [3], and $$K = \prod_{b'=b_{hop}}^{B_{SRS}} N_b (\text{where } N_{b_{hop}} = 1$$

regardless of the $N_b$ value), except when a single
SRS transmission is configured for the UE. If a UE is configured with more than one serving cell, the UE is not expected to transmit SRS on different antenna ports simultaneously.
A UE may be configured to transmit SRS on Np antenna ports of a serving cell where Np may be configured by higher layer signalling. For PUSCH transmission mode 1 $N_p \in \{0,1,2,4\}$ and for PUSCH transmission mode 2 $N_p \in \{0,1,2\}$ with two antenna ports configured for PUSCH and $N_p \in \{0,1,4\}$ with 4 antenna ports configured for PUSCH. A UE configured for SRS transmission on multiple antenna ports of a serving cell shall transmit SRS for all the configured transmit antenna ports within one SC-FDMA symbol of the same subframe of the serving cell.
The SRS transmission bandwidth and starting physical resource block assignment are the same for all the configured antenna ports of a given serving cell.
A UE not configured with multiple TAGs shall not transmit SRS in a symbol whenever SRS and PUSCH transmissions happen to overlap in the same symbol.
For TDD serving cell, when one SC-FDMA symbol exists in UpPTS of the given serving cell, it can be used for SRS transmission. When two SC-FDMA symbols exist in UpPTS of the given serving cell, both can be used for SRS transmission and for trigger type 0 SRS both can be assigned to the same UE.
If a UE is not configured with multiple TAGs, or if a UE is configured with multiple TAGs and SRS and PUCCH format 2/2a/2b happen to coincide in the same subframe in the same serving cell,
The UE shall not transmit type 0 triggered SRS whenever type 0 triggered SRS and PUCCH format 2/2a/2b transmissions happen to coincide in the same subframe;
The UE shall not transmit type 1 triggered SRS whenever type 1 triggered SRS and PUCCH format 2a/2b or format 2 with HARQ-ACK transmissions happen to coincide in the same subframe;
The UE shall not transmit PUCCH format 2 without HARQ-ACK whenever type 1 triggered SRS and PUCCH format 2 without HARQ-ACK transmissions happen to coincide in the same subframe.
If a UE is not configured with multiple TAGs, or if a UE is configured with multiple TAGs and SRS and PUCCH happen to coincide in the same subframe in the same serving cell,
The UE shall not transmit SRS whenever SRS transmission and PUCCH transmission carrying HARQ-ACK and/or positive SR happen to coincide in the same subframe if the parameter ackNackSRS-SimultaneousTransmission is FALSE;

TABLE 3-continued

For FDD-TDD and primary cell frame structure 1, the UE shall not transmit SRS in a symbol whenever SRS transmission and PUCCH transmission carrying HARQ-ACK and/or positive SR using shortened format as defined in subclauses 5.4.1 and 5.4.2A of [3] happen to overlap in the same symbol if the parameter ackNackSRS-SimultaneousTransmission is TRUE.

Unless otherwise prohibited, the UE shall transmit SRS whenever SRS transmission and PUCCH transmission carrying HARQ-ACK and/or positive SR using shortened format as defined in subclauses 5.4.1 and 5.4.2A of [3] happen to coincide in the same subframe if the parameter ackNackSRS-SimultaneousTransmission is TRUE. A UE not configured with multiple TAGs shall not transmit SRS whenever SRS transmission on any serving cells and PUCCH transmission carrying HARQ-ACK and/or positive SR using normal PUCCH format as defined in subclauses 5.4.1 and 5.4.2A of [3] happen to coincide in the same subframe.

In UpPTS, whenever SRS transmission instance overlaps with the PRACH region for preamble format 4 or exceeds the range of uplink system bandwidth configured in the serving cell, the UE shall not transmit SRS.

The parameter ackNackSRS-SimultaneousTransmission provided by higher layers determines if a UE is configured to support the transmission of HARQ-ACK on PUCCH and SRS in one subframe. If it is configured to support the transmission of HARQ-ACK on PUCCH and SRS in one subframe, then in the cell specific SRS subframes of the primary cell UE shall transmit HARQ-ACK and SR using the shortened PUCCH format as defined in subclauses 5.4.1 and 5.4.2A of [3], where the HARQ-ACK or the SR symbol corresponding to the SRS location is punctured. This shortened PUCCH format shall be used in a cell specific SRS subframe of the primary cell even if the UE does not transmit SRS in that subframe. The cell specific SRS subframes are defined in subclause 5.5.3.3 of [3]. Otherwise, the UE shall use the normal PUCCH format 1/1a/1b as defined in subclause 5.4.1 of [3] or normal PUCCH format 3 as defined in subclause 5.4.2A of [3] for the transmission of HARQ-ACK and SR.

Trigger type 0 SRS configuration of a UE in a serving cell for SRS periodicity, $T_{SRS}$, and SRS subframe offset, $T_{offset}$, is defined in Table 8.2-1 and Table 8.2-2, for FDD and TDD serving cell, respectively. The periodicity $T_{SRS}$ of the SRS transmission is serving cell specific and is selected from the set {2, 5, 10, 20, 40, 80, 160, 320} ms or subframes.

For the SRS periodicity $T_{SRS}$ of 2 ms in TDD serving cell, two SRS resources are configured in a half frame containing UL subframe(s) of the given serving cell.

Type 0 triggered SRS transmission instances in a given serving cell for TDD serving cell with $T_{SRS} > 2$ and for FDD serving cell are the subframes satisfying $(10 \cdot n_f + k_{SRS} - T_{offset}) \bmod T_{SRS} = 0$, where for FDD $k_{SRS} = \{0, 1, 0\}$ is the subframe index within the frame, for TDD serving cell $k_{SRS}$ is defined in Table 8.2-3. The SRS transmission instances for TDD serving cell with $T_{SRS} = 2$ are the subframes satisfying $k_{SRS} - T_{offset}$.

For TDD serving cell, and a UE configured for type 0 triggered SRS transmission in serving cell c, and the UE configured with the parameter EIMTA-MainConfigServCell-r12 for serving cell c, if the UE does not detect an UL/DL configuration indication for radio frame m (as described in section 13.1), the UE shall not transmit trigger type 0 SRS in a subframe of radio frame m that is indicated by the parameter eimta-HarqReferenceConfig-r12 as a downlink subframe unless the UE transmits PUSCH in the same subframe.

Trigger type 1 SRS configuration of a UE in a serving cell for SRS periodicity, $T_{SRS,1}$, and SRS subframe offset, $T_{offset,1}$, is defined in Table 8.2-4 and Table 8.2-5, for FDD and TDD serving cell, respectively. The periodicity $T_{SRS,1}$ of the SRS transmission is serving cell specific and is selected from the set {2, 5, 10} ms or subframes.

For the SRS periodicity $T_{SRS,1}$ of 2 ms in TDD serving cell, two SRS resources are configured in a half frame containing UL subframe(s) of the given serving cell.

A UE configured for type 1 triggered SRS transmission in serving cell c and not configured with a carrier indicator field shall transmit SRS on serving cell c upon detection of a positive SRS request in PDCCH/EPDCCH scheduling PUSCH/PDSCH on serving cell c.

A UE configured for type 1 triggered SRS transmission in serving cell c and configured with a carrier indicator field shall transmit SRS on serving cell c upon detection of a positive SRS request in PDCCH/EPDCCH scheduling PUSCH/PDSCH with the value of carrier indicator field corresponding to serving cell c.

A UE configured for type 1 triggered SRS transmission on serving cell c upon detection of a positive SRS request in subframe n of serving cell c shall commence SRS transmission in the first subframe satisfying n + k, k ≥ 4 and $(10 \cdot n_f + k_{SRS} - T_{offset,1}) \bmod T_{SRS,1} = 0$ for TDD serving cell c with $T_{SRS,1} > 2$ and for FDD serving cell c,
$(k_{SRS} - T_{offset,1}) \bmod 5 = 0$ for TDD serving cell c with $T_{SRS,1} = 2$
where for FDD serving cell c $k_{SRS} = \{0,1, \ldots, 9\}$ is the subframe index within the frame $n_f$, for TDD serving cell c $k_{SRS}$ is defined in Table 8.2-3.

A UE configured for type 1 triggered SRS transmission is not expected to receive type 1 SRS triggering events associated wit hdifferent values of trigger type 1 SRS transmission parameters, as configured by higher layer signalling, for the same subframe and the same serving cell.

For TDD serving cell c, and a UE configured with EIMTA-MainConfigServCell-r12 for a serving cell c, the UE shall not transmit SRS in a subframe of a radio frame that is indicated by the corresponding eIMTA-UL/DL-configuration as a downlink subframe.

TABLE 3-continued

A UE shall not transmit SRS whenever SRS and a PUSCH transmission corresponding to a Random Access Response Grant or a retransmission of the same transport block as part of the conetntion based random access procedure coincide in the same subframe.

Table 4 below a subframe offset $T_{offset}$ and UE-specific SRS periodicity $T_{SRS}$ for trigger type 0 in FDD.

TABLE 4

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

Table 5 below a subframe offset $T_{offset}$ and UE-specific SRS periodicity $T_{SRS}$ for trigger type 0 in TDD.

TABLE 5

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

TABLE 6

| SRS Configuration Index $I_{SRS}$ | SRS Periodicity (ms) | SRS Subframe Offset |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS} - 10$ |
| 15-24 | 10 | $I_{SRS} - 15$ |
| 25-44 | 20 | $I_{SRS} - 25$ |
| 45-84 | 40 | $I_{SRS} - 45$ |
| 85-164 | 80 | $I_{SRS} - 85$ |
| 165-324 | 160 | $I_{SRS} - 165$ |
| 325-644 | 320 | $I_{SRS} - 325$ |
| 645-1023 | reserved | reserved |

Table 7 shows $k_{SRS}$ for TDD.

TABLE 7

| | | subframe index n | | | | | | | | | |
|---|---|---|---|---|---|---|---|---|---|---|---|
| | | 1 | | | | | | 6 | | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | 1 | | 2 | 3 | 4 | | 5 | 6 | 7 | 8 | 9 |
| $k_{SRS}$ in case UpPTS length of 1 symbol | 1 | | | 2 | 3 | 4 | | 6 | | 7 | 8 | 9 |

Table 8 below a subframe offset $T_{offset,1}$ and UE-specific SRS periodicity $T_{SRS},1$ for trigger type 1 in FDD.

TABLE 8

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS} - 2$ |
| 7-16 | 10 | $I_{SRS} - 7$ |
| 17-31 | reserved | reserved |

Table 9 belows a subframe offset $T_{offset,1}$ and UE-specific SRS periodicity $T_{SRS},1$ for trigger type 1 in TDD.

TABLE 9

| SRS Configuration Index $I_{SRS}$ | SRS Periodicity (ms) | SRS Subframe Offset |
|---|---|---|
| 0 | reserved | reserved |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |

TABLE 9-continued

| SRS Configuration Index $I_{SRS}$ | SRS Periodicity (ms) | SRS Subframe Offset |
|---|---|---|
| 9 | 2 | 3, 4 |
| 10-14 | 5 | $I_{SRS} - 10$ |
| 15-24 | 10 | $I_{SRS} - 15$ |
| 25-31 | reserved | reserved |

Analog Beamforming

In an mmW system, since a wavelength is short, a plurality of antennas can be installed in the same area. That is, considering that the wavelength in the 30 GHz band is 1 cm, a total of 64 (8×8) antenna elements can be installed in a 4 cm by 4 cm panel at intervals of 0.5 lambda (wavelength) in the case of a 2-dimensional array. Therefore, in the mmW system, it is attempted to improve the coverage or throughput by increasing the beamforming (BF) gain using multiple antenna elements. In this case, if each antenna element includes a transceiver unit (TXRU) to enable adjustment of transmit power and phase per antenna element, each antenna element can perform independent beamforming per frequency resource. However, installing TXRUs in all of the about 100 antenna elements is less feasible in terms of cost. Therefore, a method of mapping a plurality of antenna elements to one TXRU and adjusting the direction of a beam using an analog phase shifter has been considered. However, such an analog beamforming method is disadvantageous in that frequency selective beaming is impossible because only one beam direction is generated over the full band. As an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 2A:
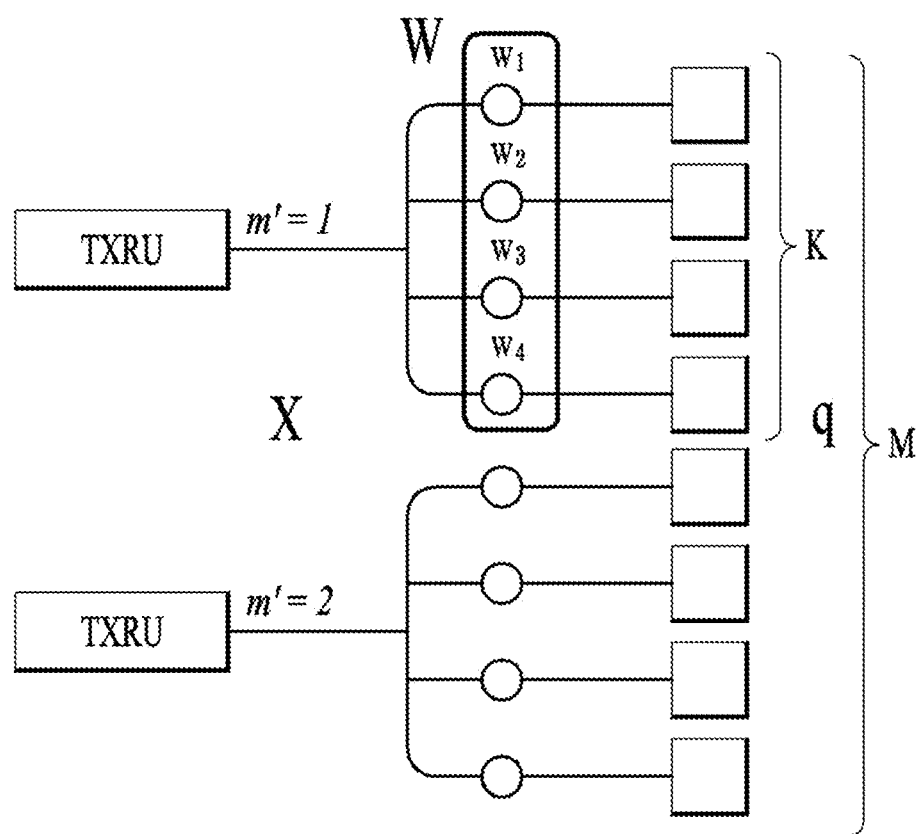
FIG. 2a is a view showing TXRU virtualization model option 1 (sub-array model) and FIG. 2b is a view showing TXRU virtualization model option 2 (full connection model)
Figure 2B:
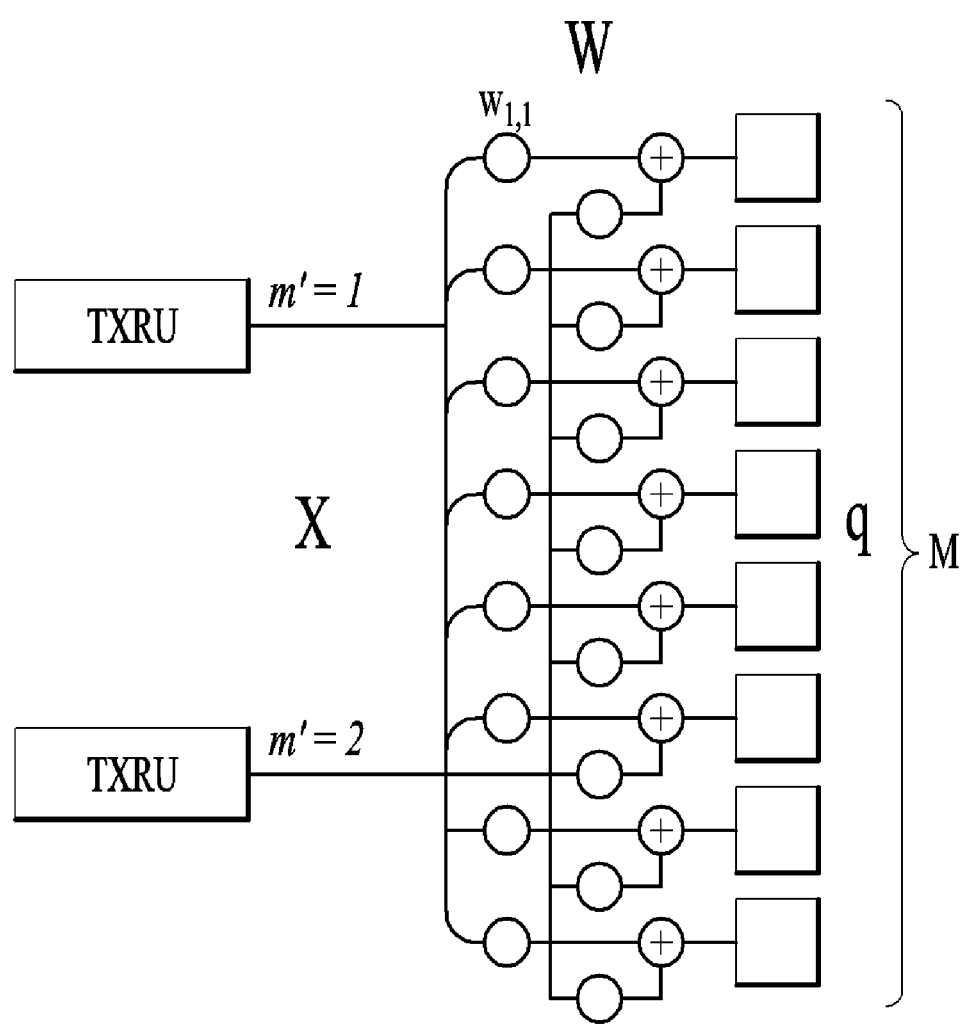

FIG. 2a is a view showing TXRU virtualization model option 1 (sub-array model) and FIG. 2b is a view showing TXRU virtualization model option 2 (full connection model).

FIGS. 2a and 2b show representative examples of a method of connecting TXRUs and antenna elements. Here, the TXRU virtualization model shows a relationship between TXRU output signals and antenna element output signals. FIG. 2a shows a method of connecting TXRUs to sub-arrays. In this case, one antenna element is connected to one TXRU. In contrast, FIG. 2b shows a method of connecting all TXRUs to all antenna elements. In this case, all antenna elements are connected to all TXRUs. In FIGS. 2a and 2b, W indicates a phase vector weighted by an analog phase shifter. That is, W is a major parameter determining the direction of the analog beamforming. In this case, the mapping relationship between CSI-RS antenna ports and TXRUs may be 1-to-1 or 1-to-many.

Hybrid Beamforming

Figure 3:
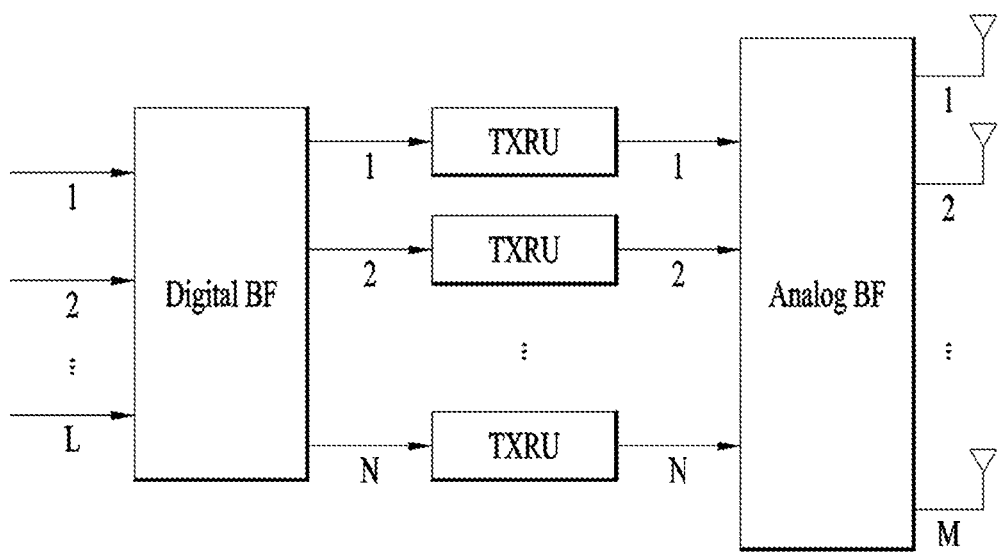
FIG. 3 is a block diagram for hybrid beamforming.

FIG. 3 is a block diagram for hybrid beamforming.

Figure 4:
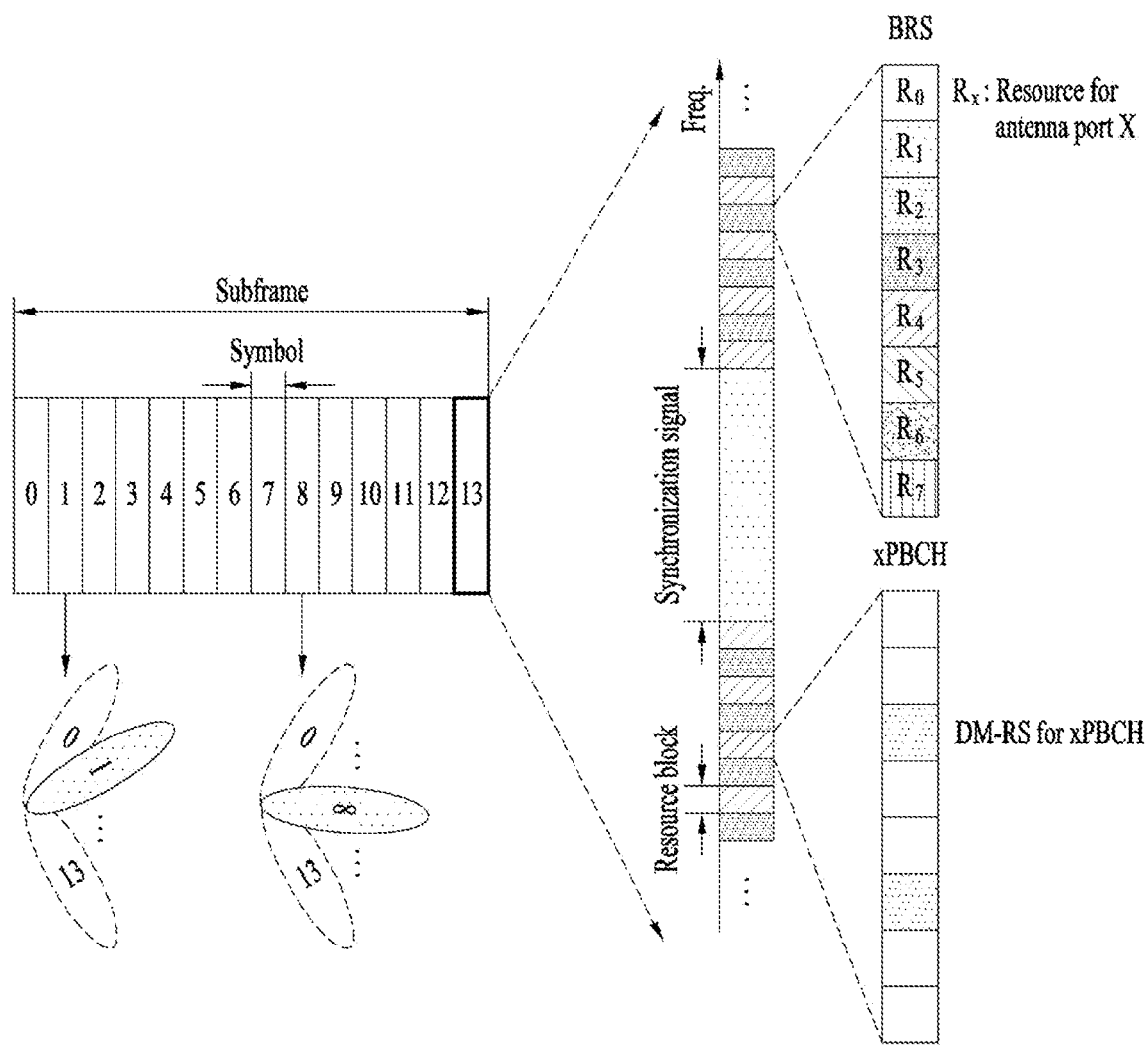
FIG. 4 is a view showing an example of beams mapped to BRS symbols in hybrid beamforming.

If a plurality of antennas is used in a new RAT system, a hybrid beamforming scheme which is a combination of digital beamforming and analog beamforming may be used. At this time, analog beamforming (or RF beamforming) means operation of performing precoding (or combining) at an RF stage. In the hybrid beamforming scheme, each of a baseband stage and an RF stage uses a precoding (or combining) method, thereby reducing the number of RF chains and the number of D/A (or A/D) converters and obtaining performance similar to performance of digital beamforming. For convenience of description, as shown in FIG. 4, the hybrid beamforming structure may be expressed by N transceivers (TXRUs) and M physical antennas. Digital beamforming for L data layers to be transmitted by a transmission side may be expressed by an N×L matrix, N digital signals are converted into analog signals through TXRUs and then analog beamforming expressed by an M×N matrix is applied.

FIG. 3 shows a hybrid beamforming structure in terms of the TXRUs and physical antennas. At this time, in FIG. 3, the number of digital beams is L and the number of analog beams is N. Further, in the new RAT system, a BS is designed to change analog beamforming in symbol units, thereby supporting more efficient beamforming for a UE located in a specific region. Furthermore, in FIG. 3, when N TXRUs and M RF antennas are defined as one antenna panel, up to a method of introducing a plurality of antenna panels, to which independent hybrid beamforming is applicable, is being considered in the new RAT system.

When the BS uses a plurality of analog beams, since an analog beam which is advantageous for signal reception may differ between UEs, the BS may consider beam sweeping operation in which the plurality of analog beams, which will be applied by the BS in a specific subframe (SF), is changed according to symbol with respect to at least synchronization signals, system information, paging, etc. such that all UEs have reception opportunities.

FIG. 4 is a view showing an example of beams mapped to BRS symbols in hybrid beamforming.

FIG. 4 shows the beam sweeping operation with respect to synchronization signals and system information in a downlink (DL) transmission procedure. In FIG. 4, a physical resource (or physical channel) through which the system information of the new RAT system is transmitted in a broadcast manner is named xPBCH (physical broadcast channel). At this time, analog beams belonging to different antenna panels may be simultaneously transmitted within one symbol, and, in order to measure a channel per analog beam, as shown in FIG. 4, a method of introducing a beam reference signal (BRS) which is an RS transmitted by applying a single analog beam (corresponding to a specific analog panel) may be considered. The BRS may be defined with respect to a plurality of antenna ports and each antenna port of the BRS may correspond to a single analog beam. Although the RS used to measure the beam is given BRS in FIG. 5, the RS used to measure the beam may be named another name. At this time, unlike the BRS, a synchronization signal or xPBCH may be transmitted by applying all analog beams of an analog beam group, such that an arbitrary UE properly receives the synchronization signal or xPBCH.

Figure 5:
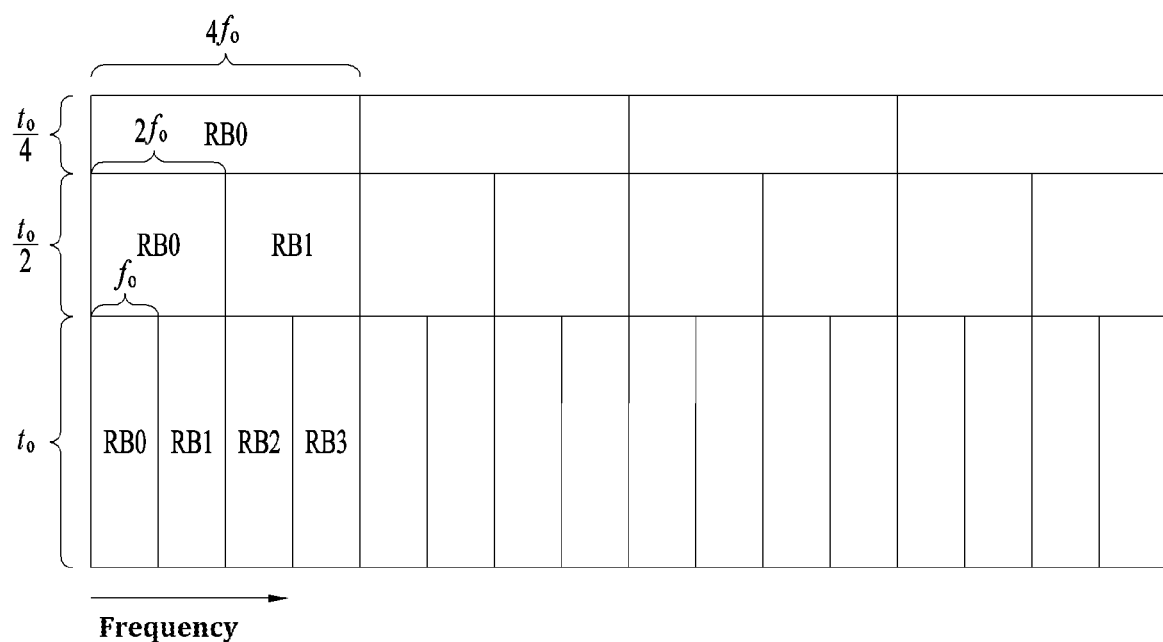
FIG. 5 is a view showing symbol/sub-symbol alignment between different numerologies.

FIG. 5 is a view showing symbol/sub-symbol alignment between different numerologies.

New RAT(NR) Numerology Characteristics

In NR, a method of supporting scalable numerology is being considered. That is, a subcarrier spacing of NR is (2n×15) kHz and n is an integer. From the nested viewpoint, a subset or a superset (at least 15, 30, 60, 120, 240, and 480 kHz) is being considered as a main subcarrier spacing. Symbol or sub-symbol alignment between different numerologies was supported by performing control to have the same CP overhead ratio. In addition, numerology is determined in a structure for dynamically allocating time/frequency granularity according to services (eMMB, URLLC and mMTC) and scenarios (high speed, etc.).

Bandwidth Dependent/Non-Dependent Sequence for Orthogonalization

In an LTE system, an SRS is differently designed according to sounding bandwidth. That is, a computer-generated sequence is used when a sequence having a length 24 or less is designed and a Zadoff-Chu (ZC) sequence is used in the case of 36 (3RB) or more. The greatest advantages of the ZC sequence are that the ZC sequence has low PAPR or low cubic metric and simultaneously has ideal autocorrelation and low cross-correlation properties. However, in order to satisfy such properties, the lengths (indicating sounding bandwidth) of necessary sequences should be the same. Accordingly, in order to support UEs having different sounding bandwidths, allocation to different resource regions is necessary. In order to minimize channel estimation performance deterioration, IFDMA comb structures have different sounding bandwidths to support orthogonality of UEs for performing simultaneous transmission. If such a transmission comb (TC) structure is used in a UE having small sounding bandwidth, a sequence length may become less than a minimum sequence length (generally, a length of 24) having orthogonality and thus TC is limited to 2. If the same TC is used in the same sounding resource, a dimension for providing orthogonality is necessary, thereby leading to use of CDM using cyclic shift.

Meanwhile, there are sequences which have PAPR and correlation performances slightly lower than those of ZC sequences but are capable of being subjected to resource mapping regardless of sounding bandwidth, such as a Golay sequence and a pseudo random (PN) sequence. In the case of a Golay sequence, when the autocorrelation values of certain sequences a and b are $A_a$ and $A_b$, a and b, the sum of the autocorrelation values of which satisfies the following condition, are referred to as a Golay complementary sequence pair ($A_a+A_b=\delta(x)$).

Figure 6:
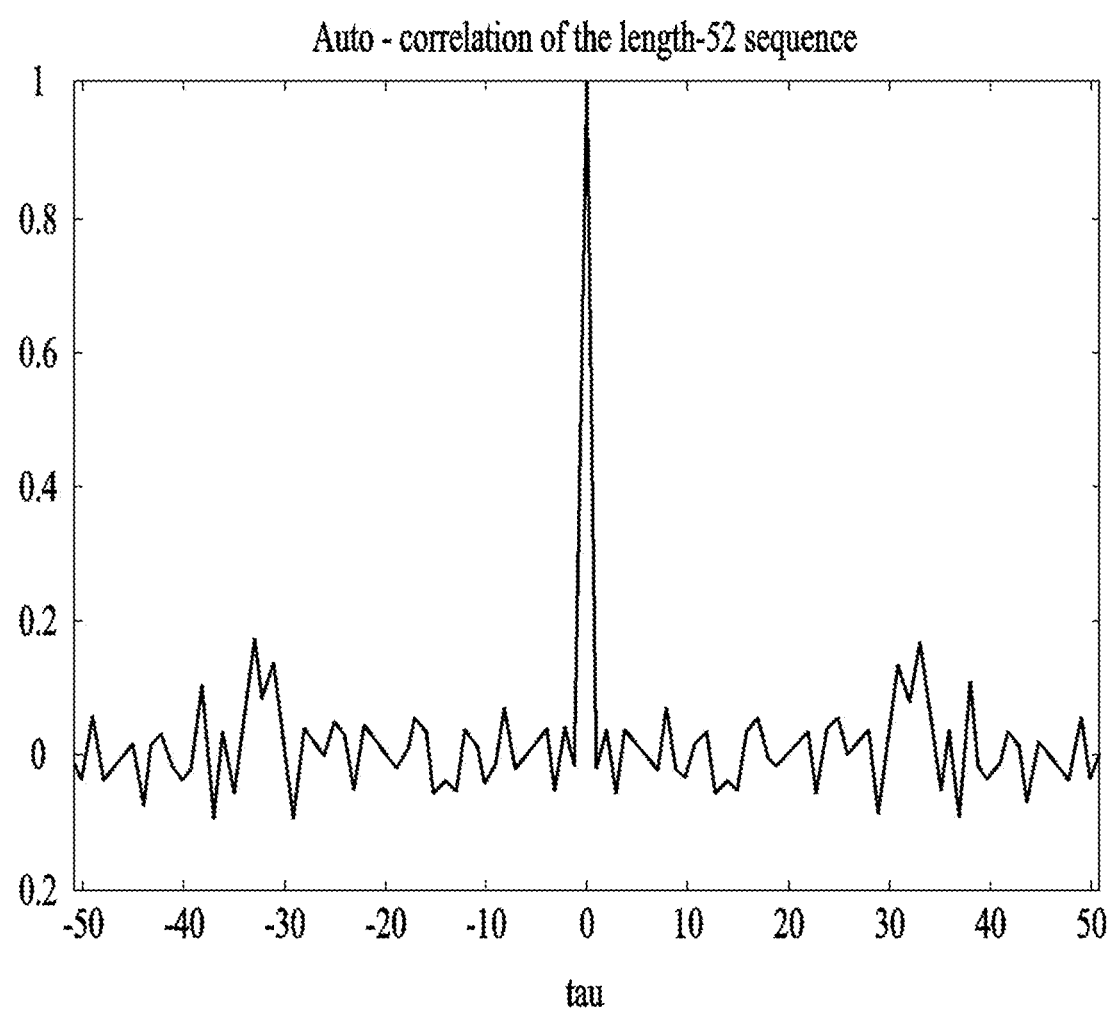
FIG. 6 is a view showing performance of 52-length autocorrelation using two 26-length Golay Complementary Sequence pairs.

For example, when length-26 Golay sequences a and b are a=[b 1 −1 1 1 −1 −1 1 −1 −1 −1 −1 1 −1 1 −1 −1 −1 1 1 −1 −1 −1 1 −1 1] and b=[−1 1 −1 −1 1 1 −1 1 1 1 1 −1 −1 −1 −1 −1 −1 −1 1 1 −1 −1 −1 1 −1 1], the two sequences are concatenated to configure a 52-length sequence. In addition, when 0 is mapped to four resource elements (REs) of both sides, auto-correlation performance shown in FIG. 7 may be obtained. FIG. 6 is a view showing performance of 52-length autocorrelation using two 26-length Golay Complementary Sequence pairs.

Figure 7:
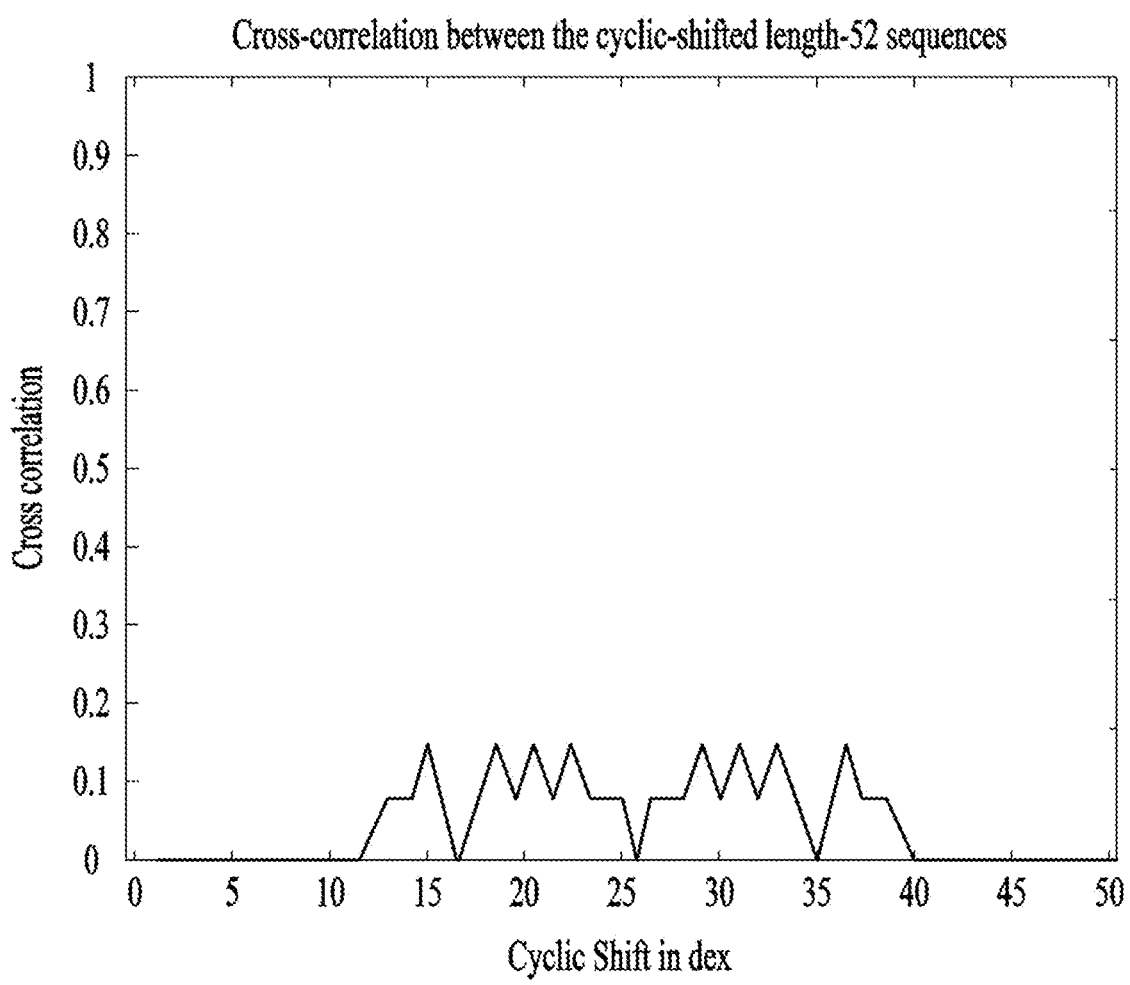
FIG. 7 is a view showing cross-correlation between sequences having different CSs in a 52-length Golay sequence.

FIG. 7 is a view showing cross-correlation between sequences having different CSs in a 52-length Golay sequence.

A plurality of cyclic shifts (CSs) may be applied to the 52-length sequences to generate a plurality of Golay sequences. Cross-correlation between Golay sequences having different CSs is shown in FIG. 8.

FIG. 8 is a view showing cross-correlation and cubic-metric evaluations of ZC, Golay and PN sequences.

The cubic metrics (CMs) and cross-correlations of the ZC, Golay and PN sequences are calculated and compared when TC is 1, 2 or 4. Assumption for evaluation are as follows.

The sounding BW is set to 4, 8, 12, 16, 20, 24, 32, 36, and 48 RBs (based on LTE SRS design).

Like the LTE system, 30-group number $u=(f_{gh}(n_s)+f_{ss})$ mod 30 is determined as follows and $(f_{gh}(n_s),f_{ss})$ is determined based on a cell ID. At this time, one base sequence v is selected in 4 RBs and two base sequence numbers v are selected in the others.

In the case of the Golay sequence, a 2-48-length truncated binary Golay sequence in an 802.16m system was used and a QPSK PN sequence was used as an independent bandwidth SRS design example. At this time, in order to represent 30 groups in the ZC sequence, the Golay sequence was generated using 30 CSs and 30 PN sequence were generated in Matlab.

Evaluation was performed using TC=1, 2 and 4.

In cubic metric evaluation, an over sampling factor (OSF) was set to 8 for better resolution.

Referring to (a) of FIG. 8, cross correlation performance was in order of ZC>Golay>PN sequence, and CM performance was in order of ZC>Golay>PN. In order to generate an SRS sequence for UL transmission, the ZC sequence has good performance as in the LTE system. However, in order to increase a degree of freedom in allocation of sounding bandwidth to each UE, the Golay sequence or the PN sequence may not be excluded as SRS sequence candidates of New RAT.

SRS hopping characteristics in the LTE system are as follows.

SRS hopping operation is performed only at the time of periodic SRS triggering (triggering type 0).

Allocation of SRS resources is given in a predefined hopping pattern.

A hopping pattern may be configured through RRC signaling in a UE-specific manner (however, overlapping is not allowed).

The SRSs may be frequency-hopped and transmitted using a hopping pattern for each subframe in which a cell/UE-specific SRS is transmitted.

The SRS frequency-domain start position and hopping equation are analyzed through Equation 1 below.

$$k_0^{(p)} = \bar{k}_0^{(p)} + \sum_{b=0}^{B_{SRS}} K_{TC} M_{sc,b}^{RS} n_b \qquad \text{[Equation 1]}$$

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases}$$

-continued $$F_b(n_{SRS}) = \begin{cases} (N_b/2) \left\lfloor \dfrac{n_{SRS} \bmod \prod_{b'=b_{hop}}^{b} N_{b'}}{\prod_{b'=b_{hop}}^{b-1} N_{b'}} \right\rfloor + \left\lfloor \dfrac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \left\lfloor n_{SRS} \Big/ \prod_{b'=b_{hop}}^{b-1} N_{b'} \right\rfloor & \text{if } N_b \text{ odd} \end{cases}$$

$$n_{SRS} = \begin{cases} 2N_{SP} n_f + 2(N_{SP} - 1) \left\lfloor \dfrac{n_s}{10} \right\rfloor + \left\lfloor \dfrac{T_{offset}}{T_{offset\_max}} \right\rfloor, \\ \lfloor (n_f \times 10 + \lfloor n_s/2 \rfloor)/T_{SRS} \rfloor, \end{cases}$$

for 2 ms SRS periodicity of frame structure type 2 otherwise where, $n_{SRS}$ denotes a hopping interval in the time domain, $N_b$ denotes the number of branches allocated to a tree level b, and b may be determined by setting $B_{SRS}$ in dedicated RRC.

Figure 9:
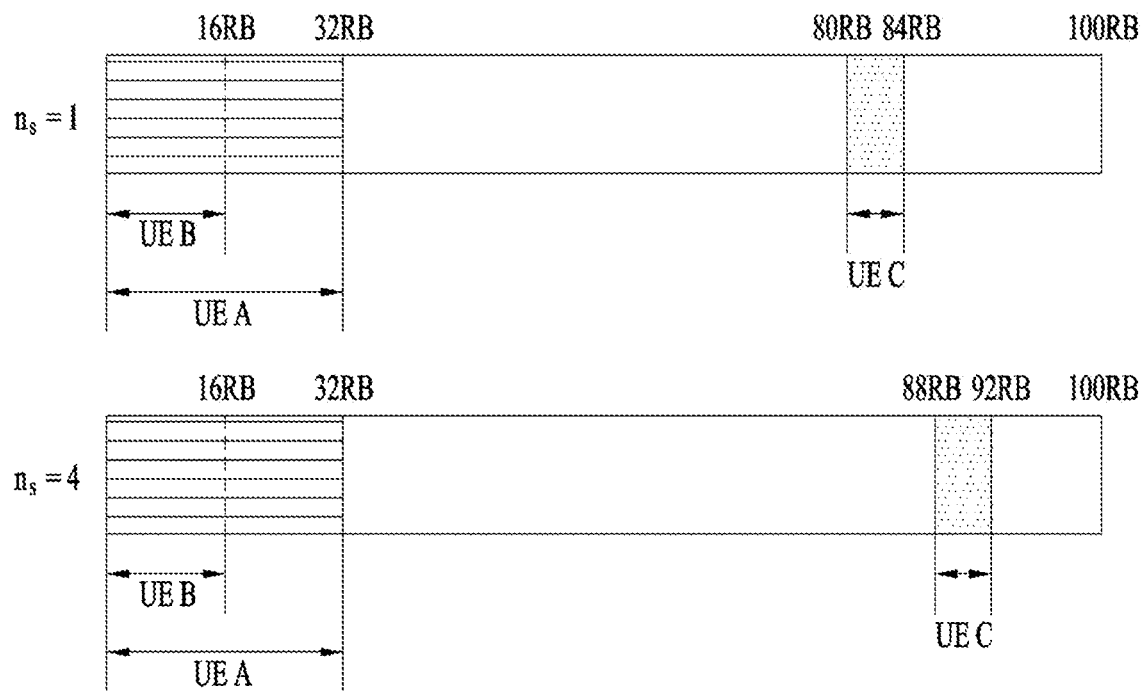
FIG. 9 is a view showing an LTE hopping pattern ($n_s=1 \rightarrow n_s=4$)

FIG. 9 is a view showing an LTE hopping pattern ($n_s=1 \rightarrow n_s=4$).

An example of configuring an LTE hopping pattern will be described.

LTE hopping pattern parameters may be set through cell-specific RRC signaling. For example, $C_{SRS}=1$, $N_{RB}^{UL}=100$, $n_f=1$, $n_s=1$ may be set. Next, LTE hopping pattern parameters may be set through UE-specific RRC signaling. For example, UE A: $B_{SRS}=1$, $b_{hop}=0$, $n_{RRC}=22$, $T_{SRS}=10$
UE B: $B_{SRS}=2$, $b_{hop}=0$, $n_{RRC}=10$, $T_{SRS}=5$
UE C: $B_{SRS}=3$, $b_{hop}=2$, $n_{RRC}=23$, $T_{SRS}=2$ may be set.

Table 10 below shows agreements about SRS transmission resources in NR.

TABLE 10

A UE can be configured with an X-port SRS resource, where the SRS resource spans one or multiple OFDM symbols within a single slot
FFS where all of the X SRS ports are sounded in each OFDM symbol
FFS at least for the purposes of CSI acquisition:
FFS a multi-symbol SRS resource can be configured such that the X SRS ports in each OFDM symbol are transmitted in different locations of the band in different OFDM symbols in the slot in a frequency hopping manner
Note: This allows sounding a larger part of (or the full) UE bandwidth using narrower band SRS transmissions
Note: at any OFDM symbol, all X ports are sounded in the same portion of the band
Note: Consider UE RF implementation aspects on SRS design that may place constraints on the design of the symbol-wise hopping pattern
e.g., Required time for frequency re-tuning (if re-tuning needed) or transient period if re-tuning is not needed It has been approved that SRS frequency hopping should be supported in multiple SRS symbols configured in 3GPP RAN1 88 biz, and frequency hopping between slots in which SRS is configured should be supported. SRS configuration for full-band uplink resource allocation may be necessary while certain SRS resource hops when one multi-symbol SRS is triggered. SRS configuration for full-band uplink resource allocation also may be necessary for UL beam management. For example, when multiple SRSs are triggered for UL beam management of an NR UE, subband-wise UL beam management using the same Tx precoding of the NR UE may be necessary.

FIG. 10 illustrates multi symbol SRS triggering for uplink beam management.

Referring to FIG. 10, although UL SRS bandwidth may be configured in one symbol, multi-symbol SRS may be triggered and configured for the purpose of UL beam management, etc. When the multi-symbol SRS is triggered and the same Tx precoding is performed in SRS resources (or SRS transmission resources) which is hopped on each symbol, the UE may provide more transmit (Tx) power per SRS symbol. The BS may perform subband selection through a symbol indication after detecting SRS resource per symbol.

Proposal 1

The BS may configure some or all of a combination of SRS sequence generation parameters (e.g., TC (Transmission Comb), TC offset, CS (Cyclic Shift) and root) for SRS resources, in which frequency hopping is performed, are changed according to the (frequency) hopping pattern, and the BS may transmit the configured information to the UE or transmit changed values of the SRS sequence generation parameter values, which desire to be changed, to the UE.

Proposal 1-1

As the detailed proposal of Proposal 1, in Proposal 1-1, SRS sequence generation parameters (e.g., TC, TC offset, CS, root, etc.) configured for the allocated SRS resource are differently applicable according to the frequency hopping pattern when frequency hopping is enabled. Additionally, by changing the SRS sequence generation parameters according to frequency hopping without additionally increasing dynamic UL downlink control information (DCI) overhead, the BS may determine whether a specific frequency hopping pattern is properly performed with respect to the UE after SRS detection.

Figure 11:
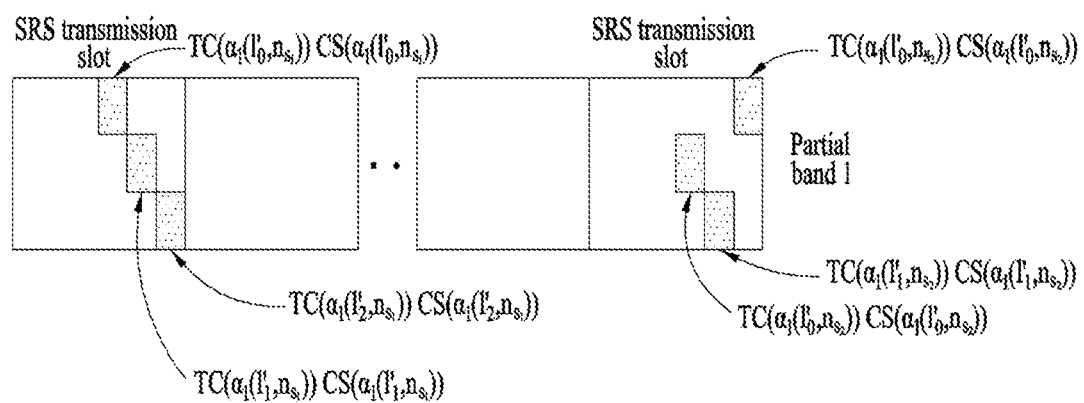
FIG. 11 illustrates an SRS sequence generation parameter combination $\{TC(\alpha_1(l',n_s)), CS(\alpha_1(l',n_s))\}$ according to a hopping pattern $\alpha_1(l',n_s)$.

FIG. 11 is illustrates combination of SRS sequence generation parameters $\{TC(\alpha_1(l', n_s)), CS(\alpha_1(l', n_s))\}$ according to a hopping pattern $\alpha_1(l', n_s)$.

Referring to FIG. 11, when the hopping pattern $\alpha_1(l',n_s)$ is configured for a UE A (where, l' denotes a configured SRS symbol index and $n_s$ denotes a configured SRS slot index), a combination of SRS sequence generation parameters corresponding to specific l', $n_s$ and $n_f(n_f$ being a frame index) may be represented by {TC($\alpha_1$(l', $n_s$)), TC_offset ($\alpha_1$(l', $n_s$)), CS($\alpha_1$(l', $n_s$)),root ($\alpha_1$(l', $n_s$))}.

Proposal 1-2

The BS transmits a subset of SRS sequence generation parameters among SRS sequence generation parameters (e.g., TC, TC offset, CS, root, etc.) configured for SRS resources in which frequency hopping (e.g., intra-slot hopping (or referred to as symbol level hopping) or inter-slot hopping (or referred to as slot level hopping)) is enabled through radio resource control (RRC) signaling of Layer 3 and transmits remaining subset of the SRS generation parameters configured for the allocated SRS resources through downlink control information (DCI) (or DCI format) of Layer 1. The configuration of the subset of the SRS sequence generation parameters is as follows.

- The BS transmits TC, TC offset and CS values to the UE through dedicated RRC signaling and transmits root value to the UE through DCI. In order for the UE to differently apply the root value according to symbol when the multiple symbol SRSs (or may be referred as multiple symbol SRS resources) are configured in one SRS transmission slot, the BS may transmit the root values corresponding to the number of multiple symbol SRSs to the UE through DCI or may equally set a root value of sequences of the multiple symbol SRSs and then transmit one root value to the UE.
- The BS may transmit TC and TC offset through dedicated RRC signaling and transmit CS and root values through DCI.
- The BS may transmit only the TC value through dedicated RRC signaling and transmit TC offset, CS and root values through DCI.
- The BS may transmit only the CS value through dedicated RRC signaling and transmit the remaining subset (e.g., TC, TC offset and root) through DCI.
- The BS may transmit only the root value through dedicated RRC signaling and transmit the remaining subset (e.g., TC, TC offset and CS) through DCI.
- The BS may transmit various combinations of TC, TC offset, CS and root values through DCI or RRC signaling.

The UE may generate sequences by variously combining SRS sequence generation parameters according to hopping, thereby improving PAPR or low correlation properties. However, overhead may be increased due to DCI transmission.

Figure 12:
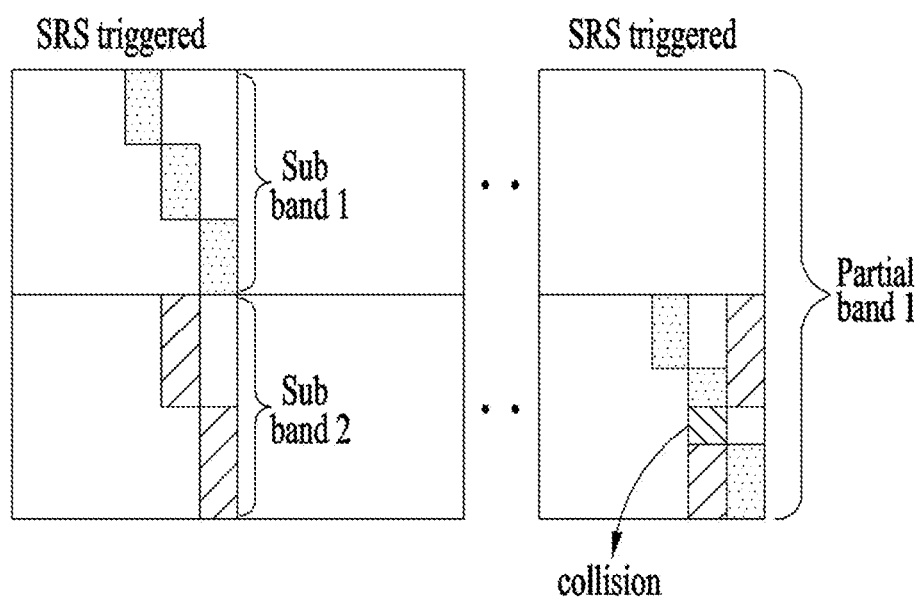
FIG. 12 illustrates occurrence of collision between UEs at the time of hopping.

FIG. 12 illustrates occurrence of collision between UEs when hopping is performed.

As one embodiment, 1) when the sequence parameter indices in resource to be allocated in SRS transmission slot 1 are TC=1, TC offset=0, CS=5 and root=10, the sequence parameter indices in resource to be allocated in next SRS transmission slot 2 are changed to TC=1, TC offset=0, CS=8 and root=11. In SRS transmission slot 2, CS=8 and root=11 may be transmitted through DCI or inferred by a hopping pattern.

As another embodiment, when a truncated ZC SRS sequence is used, different resources in SRS transmission slot 1 are allocated to UE 1 and UE 2. However, in next SRS transmission slot 2, resources of UE 1 and UE 2 overlap in terms of a specific SRS symbol index and CS=3 of UE 1 and CS=3 of UE 2 are applied and thus the BS changes CS=3 of UE 2 to CS=5 of UE 2, thereby maintaining low-correlation properties.

Proposal 1-3

As a combination of sequence generation parameters (e.g. TC, TC offset, CS and root) configured for SRS resources in which frequency hopping (e.g., intra-slot hopping, inter-slot hopping, etc.) is enabled, in order to reduce DCI signaling overhead, the BS may transmit a specific set to the UE through RRC signaling and transmit DCI including a request field to the UE and the UE may acquire information on a sequence combination corresponding to SRS resources which hopping is performed. As one embodiment, Table 11 below shows set of sequence generation parameter transmitted by the BS through the DCI.

TABLE 11

| | Sequence request field (symbol level hopping) | | | |
|---|---|---|---|---|
| | '00' | '01' | '10' | '11' |
| Combination of Sequence generation parameter | TC = 2, TC offset = 0, CS = 4, root = 10 | TC = 2, TC offset = 1, CS = 8, root = 11 | TC = 4, TC offset = 0, CS = 11, root = 2 | TC = 4, TC offset = 3, CS = 7, root = 3 |

When the UE receives the request field for the sequence generation parameter in SRS allocation resource (e.g., slot) indicating "01" through DCI, a sequence for SRS transmission in the corresponding resource (e.g., corresponding slot) may be generated using TC=2, TC offset=1, CS=8 and root=11. When the number of multiple SRS symbols in the SRS slot is 2, the UE may continuously receive the request fields of "00" and "10" from the BS. In this case, the UE may generate SRS sequence in a first SRS symbol using TC=2, TC offset=0, CS=4 and root=10 and generate the SRS sequence in a second SRS symbol using TC=4, TC offset=0, CS=11 and root=2. Alternatively, when the request field indicates "10", the UE may generate the same SRS sequence in two symbols using TC=4, TC offset=0, CS=11 and root=2.

Proposal 1-4

The BS may configure that sequence generation parameters (e.g., TC, TC offset, CS and root values) configured for SRS resource, in which frequency hopping (e.g., intra-slot hopping or inter-slot hopping) is enabled, is not changed when frequency hopping is performed. It may be desirable when hopping is performed with the most general sequence generation parameter configuration, an overlapped frequency region in a specific SRS instance is avoided or a hopping pattern is generated such that low correlation is achieved in the overlapping frequency region.

Proposal 2

A frequency hopping configuration method may be divided into slot level frequency hopping configuration (inter-slot hopping configuration) and symbol level frequency hopping configuration (intra-slot hopping configuration).

Parameters for Inter-Slot Hopping Configuration

When the parameters for inter-slot hopping configuration include SRS resource position information: The parameters for inter-slot hopping configuration may include a value indicating an SRS resource allocation band and SRS resource allocation position in each slot (e.g., an SRS allocation start RE (Resource Element) value, an SRS allocation start RB (Resource Block) value, an SRS allocation end RE value, an SRS allocation end RB value, and a value indicating an SRS transmission range and a frequency position of each slot (e.g., RIV (resource indication value), a sub-band index applied within one slot, a partial band index applied within one slot, etc. of each a specific UE), an inter-slot hopping cycle, an inter-slot hopping enable flag, etc.)

When the hopping pattern is used: The parameters for inter-slot hopping configuration may include an inter-slot hopping cycle, an inter-slot hopping enable flag and an inter-slot hopping pattern.

Parameters for Intra-Slot Hopping Configuration

When the parameters for intra-slot hopping configuration include SRS resource position information: The parameters for intra-slot hopping configuration may include a value indicating the SRS resource allocation position in each symbol (e.g., an RIV (resource indication value), an RE/RB index, a sub-band index and a partial band index), the number of configured SRS symbols in the SRS transmission slot and an index, an intra-slot hopping cycle, an intra-slot hopping enable flag, etc.

When the hopping pattern is used: The parameters for intra-slot hopping configuration may include the number of configured SRS symbols in the SRS transmission slot and an index, an intra-slot hopping cycle, an intra-slot hopping pattern, an intra-slot hopping enable flag, etc. The BS may transmit such parameters to the UE according to the following configuration.

Hopping configuration may be two combinations of intra-slot/inter-slot hopping and the hopping cycle may be defined as follows. The intra-slot hopping cycle may be defined as the number of SRS symbols until SRS resource allocated according to the number of SRS symbols hops on given SRS slots and returns to an original SRS frequency position. The inter-slot hopping cycle may be defined as the number of SRS slots until an SRS resource hops on SRS slots and returns to an original SRS frequency position.

Proposal 2-1

In the case of periodic/semi-persistent SRS, the BS may transmit the parameters for intra-slot hopping configuration to the UE through dedicated RRC signaling and transmit the parameters for inter-slot hopping configuration to the UE through DCI for SRS transmission slot. DCI signaling overhead is increased in each SRS transmission slot, but inter-slot hopping information may be dynamically acquired to flexibly configure inter-hopping. As one embodiment, an example of transmitting the parameters for intra-slot hopping through RRC signaling and transmitting the parameters for inter-slot hopping configuration through DCI when periodic/semi-persistent SRS triggering is performed will be illustrated.

Figure 13:
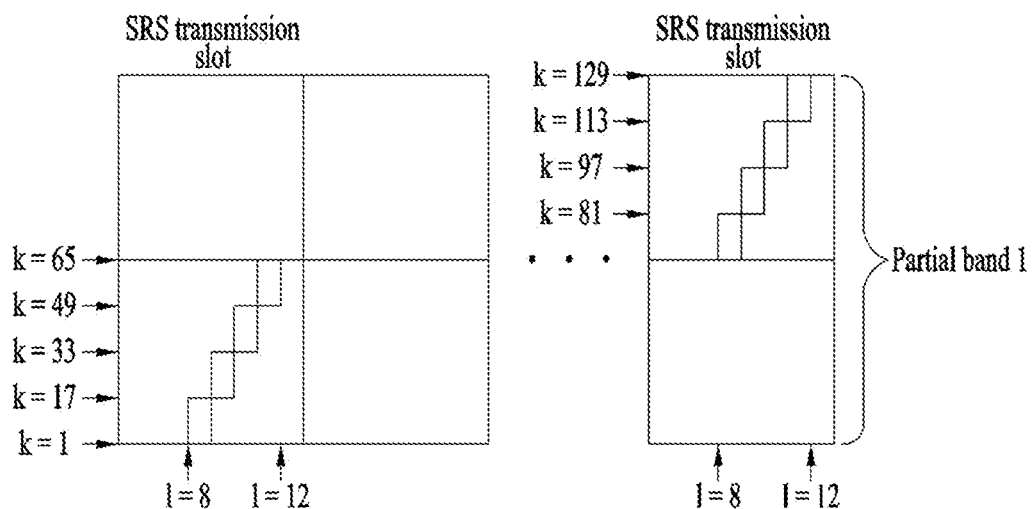
FIG. 13 illustrates an example of transmitting symbol level hopping parameters through RRC signaling and transmitting slot level hopping parameter through DCI signaling.

FIG. 13 illustrates an example of transmitting intra-slot hopping parameters through RRC signaling and transmitting inter-slot hopping parameters through DCI signaling.

Referring to FIG. 13, as an example of (dedicated) RRC signaling for intra-slot hopping configuration, the following information is transmitted through (dedicated) RRC signaling: the SRS configuration (allocation) start RB index=1, the SRS configuration (allocation) end RB index=17, the SRS BW=16 RBs, the number of configured SRS symbols in the SRS transmission slot=4, the start symbol position index of the configured SRS=8, the end symbol position index of the configured SRS=11, the partial band index=1, and the symbol hopping cycle=4 symbols.

Referring to FIG. 13, as an example of DCI signaling for inter-slot hopping configuration, the following information is transmitted through DCI signaling.

The DCI for the first SRS slot may indicate the SRS start RB index=1, the SRS end RB index=65, the partial band index=1, the inter-slot hopping cycle: 2 SRS slots, etc.

The DCI for the second SRS slot may indicate the SRS allocation start RB index=65, the SRS allocation end RB index=129, the partial band index=1, and the inter-slot hopping cycle: 2 SRS slots, etc.

The inter-slot/intra-slot hopping pattern may be understood by the following example. In NR, when the number of slots in one frame $n_f$ is $N_s$, the index of each slot is expressed as $n_s$, l' is the symbol index of the configured SRS and $T_{SRS}$ is an SRS transmission cycle, $n_{SRS}$ for hopping may be configured as shown in Equation 2 below.

$$n_{SRS} = l',$$
$$k_0^{(p)} = \bar{k}_0^{(p)} + F(i_{sb}, n_f, n_s, T_{SRS}) + \sum_{b=0}^{B_{SRS}} K_{TC} M_{sc,b}^{RS} n_b,$$ [Equation 2]

where, $F(i_{sb}, n_f, n_s, T_{SRS})$ is an intra-slot hopping position function according to a sub-band index $i_{sb}$. $B_{SRS}$ spans on one SRS sub-band. $F(i_{sb}, n_f, n_s, T_{SRS})=(i_{sb}(n_f, n_s, T_{SRS})-1) \times BW_{sb}$ and $BW_{sb}$ is the number of REs indicating the bandwidth of the sub-band. $i_{sb}(n_f, n_s, T_{SRS})=c(n_f, n_s, T_{SRS}) \bmod I_{sb}$ and $I_{sb}$ is a total number of sub-bands. $c(\ )$ is a scrambling function.

FIG. 13 shows an example in which, after hopping is performed in a localized frequency region, hopping configuration in another localized frequency region is enabled in a next SRS transmission slot. In a UE having a narrow band RF, it is advantageous to perform hopping in a localized frequency region and to perform hopping in another localized frequency region in the next slot in consideration of retuning delay.

As another example, when periodic SRS triggering occurs, the BS may transmit parameters for intra-slot hopping through RRC signaling and transmit parameters for inter-slot hopping configuration through DCI signaling.

Figure 14:
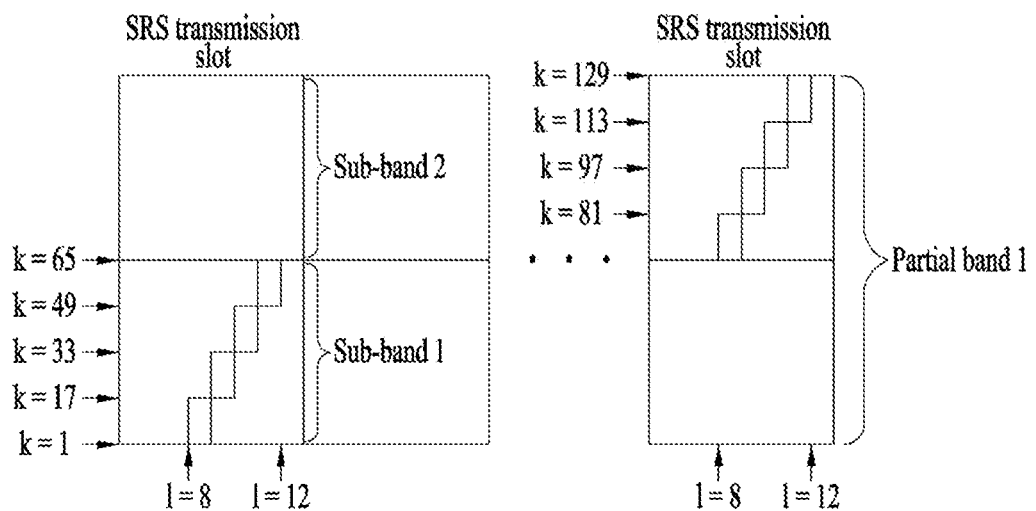
FIG. 14 illustrates the case where a BS transmits symbol level hopping parameters through DCI signaling and transmits slot level hopping parameters through RRC signaling.

FIG. 14 illustrates the case where a BS transmits intra-slot hopping parameters through DCI signaling and transmits inter-slot hopping parameters through RRC signaling.

Example of Transmission of DCI for Inter-Slot Hopping Configuration

The BS may indicate the SRS sub-band index (1 to 64 RBs)=1, the partial band index=1 and the inter-slot hopping cycle=2 SRS slots, in DCI for the first SRS slot. The BS may indicate the SRS sub-band index (1 to 64 RBs)=2, the partial band index=1, and the inter-slot hopping cycle=2 SRS slots, in DCI for the second SRS slot.

Proposal 2-1-2

In the case of periodic SRS and/or semi-persistent SRS, the BS may transmit parameters for inter-slot hopping configuration to the UE through (dedicated) RRC signaling and transmit parameters for intra-slot hopping configuration to the UE through DCI for SRS transmission slot.

This may be considered when intra-slot hopping is flexibly applied in a fixed inter-slot hopping pattern. However, parameter transmission overhead for intra-slot hopping is increased.

Figure 15:
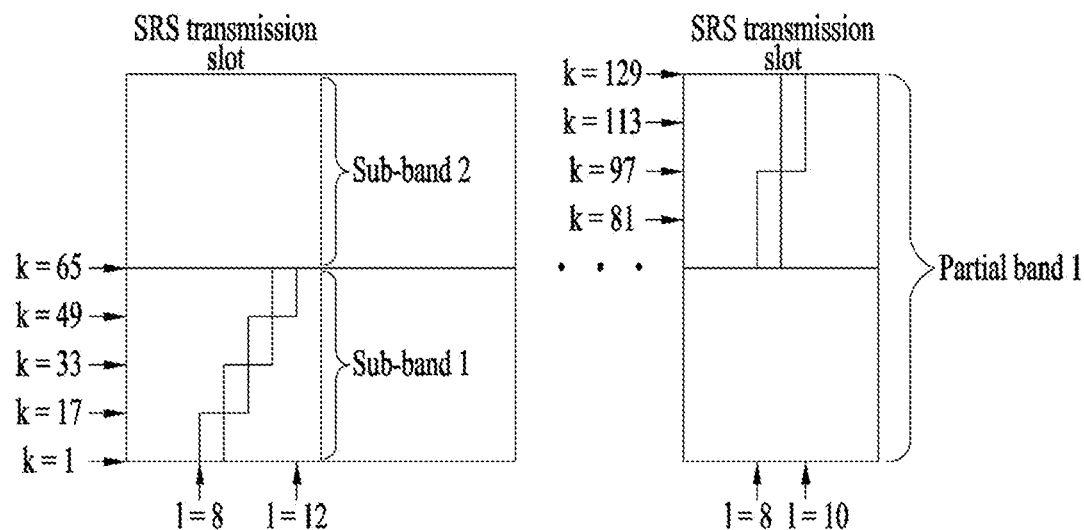
FIG. 15 illustrates the case where a BS transmits symbol level hopping parameters through RRC signaling and transmits slot level hopping parameters through DCI according to Proposal 2-1-2.

FIG. 15 illustrates the case where a BS transmits intra-slot hopping parameters through RRC signaling and transmits inter-slot hopping parameters through DCI according to Proposal 2-1-2.

As one embodiment, at the time of periodic/semi-persistent SRS transmission, the BS may transmit parameters for inter-slot hopping configuration through RRC signaling and transmit parameters for intra-slot hopping configuration through DCI (when the SRS resource position of each symbol is designated). Hereinafter, this will be described with reference to FIG. 15.

Example of transmission of (dedicated) RRC signaling for inter-slot hopping configuration: The (dedicated) RRC signaling for inter-slot hopping configuration may indicate the SRS allocation start RB index=1, the SRS allocation end RB index=129 RBs, the partial band index=1, and the inter-slot hopping cycle=2 SRS slots.

Example of transmission of DCI for intra-slot hopping configuration

The DCI for the first SRS slot may indicate the SRS BW=16 RBs, the number of configured SRS symbols in the SRS transmission slot=4, the start symbol position of the configured SRS=8, the allocation end symbol position of the configured SRS=11, the partial band index=1, and the symbol hopping cycle=4 symbols. As shown in FIG. 15, the DCI for the first SRS slot indicates the first symbol SRS start RB index=1, the first symbol SRS end RB index=17, the second symbol SRS start RB index=17, the second symbol SRS end RB index=33, the third symbol SRS start RB index=33, the third symbol SRS end RB index=49, the fourth symbol SRS start RB index=49, and the fourth symbol SRS end RB index=65.

The DCI for the second SRS slot may indicate the SRS BW=32 RBs, the number of configured SRS symbols in the SRS transmission slot=2, the start symbol position of the configured SRS=8, the end symbol position of the configured SRS=9, partial band index=1, and the symbol hopping cycle=2 symbols. As shown in FIG. 15, the DCI for the first SRS slot indicates the $1^{st}$ symbol SRS start RB index=65, the first symbol SRS end RB index=97, the second symbol SRS allocation start RB index=97, and the second symbol SRS allocation end RB index=129.

As another embodiment, at the time of periodic SRS transmission, the BS may transmit parameters for inter-slot hopping configuration through RRC signaling and transmit parameters for intra-slot hopping configuration through DCI (however, the SRS resource position of each symbol is determined by the intra-slot hopping pattern).

The (dedicated) RRC signaling for inter-slot hopping configuration may indicate the SRS allocation start RB index=1, the SRS allocation end RB index=129, partial band index=1, and the inter-slot hopping cycle=2 SRS slots.

The (dedicated) RRC signaling for intra-slot hopping configuration may indicate the SRS BW=16 RBs, the number of configured SRS symbols in the SRS transmission slot=4, the start symbol position of the configured SRS=8, the end symbol position of the configured SRS=11, the partial band index=1, the sub-band index in a partial band=1, and the symbol hopping cycle=4 symbols. The DCI for the second SRS slot may indicate the SRS BW=32 RBs, the number of configured SRS symbols in the SRS transmission slot=2, the start symbol position of the configured SRS=8, the end symbol position of the configured SRS=9, the partial band index=1, the sub-band index in a partial band=2, and the symbol hopping cycle=2 symbols.

Proposal 2-1-3

In the case of periodic/semi-persistent SRS, the BS may transmit parameters for inter-slot frequency hopping configuration and parameters for intra-slot hopping configuration to the UE through (dedicated) RRC signaling. The configuration of Proposal 2-1-3 has smallest overhead for frequency hopping. When applying intra-slot hopping and inter-slot hopping, hopping is regularly performed according to hopping pattern.

Figure 16:
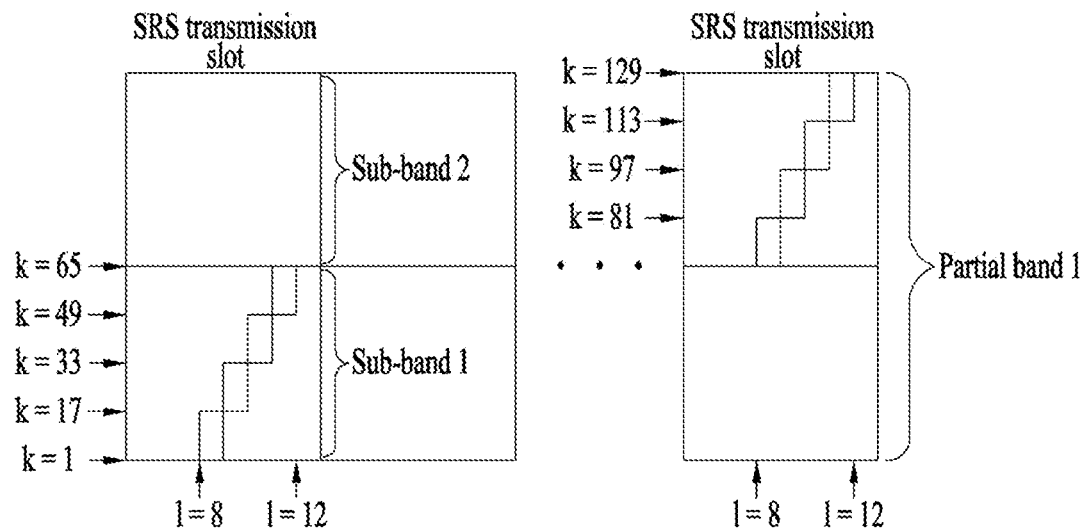
FIG. 16 illustrates an example of transmitting parameters for symbol level hopping configuration and parameters for slot level hopping configuration through RRC signaling according to Proposal 2-1-3.

FIG. 16 illustrates an example of transmitting parameters for intra-slot hopping configuration and parameters for inter-slot hopping configuration through RRC signaling according to Proposal 2-1-3.

Example of (Dedicated) RRC for Inter-Slot Hopping Configuration

Dedicated RRC signaling for inter-slot hopping configuration may indicate the SRS allocation start RB index=1, the SRS allocation end RB index=129, the partial band index=1, and the inter-slot hopping cycle=2 SRS slots.

Example of (Dedicated) RRC for Intra-Slot Hopping Configuration

Dedicated RRC signaling for intra-slot hopping configuration may indicate the SRS allocation start RB index=1, the SRS allocation end RB index=17, the SRS BW=16 RBs, the number of configured SRS symbols in the SRS transmission slot=4, the start symbol position of the configured SRS=8, the end symbol position of the configured SRS=11, the partial band index=1, and the symbol hopping cycle=4 symbols.

Proposal 2-1-4

In the case of periodic/semi-persistent SRS, the BS may transmit parameters for inter-slot hopping configuration and parameters for intra-slot hopping configuration through (dedicated) RRC and may transmit some parameters through DCI for hopping information of the SRS transmission slot. By acquiring dynamic information of specific parameters, flexible configuration may be enabled at the time of hopping. In this case, overhead is not large.

Example of Transmission of DCI of Some Hopping Parameters

Dedicated RRC signaling for inter-slot hopping configuration may indicate the SRS allocation start RB index=1, the SRS allocation end RB index=129, the partial band index=1, and the inter-slot hopping cycle=2 SRS slots. Dedicated RRC signaling for intra-slot hopping configuration may indicate the SRS BW=16 RBs, the number of configured SRS symbols in the SRS transmission slot=4, the start symbol position of the configured SRS=8, the end symbol position of the configured SRS=11, the partial band index=1, and the symbol hopping cycle=4 symbols.

DCI for Intra-Slot Hopping Configuration

The DCI for the first SRS slot may indicate the SRS sub-band index (1 to 64 RBs)=1. The DCI for the second SRS slot may indicate the SRS sub-band index (1 to 64 RBs)=2.

Proposal 2-1-5

In the case of periodic/semi-persistent SRS, during the hopping cycle (from when hopping is performed in hopping start resource to when returning to the position of the hopping start resource), a parameter (e.g., a hopping offset value) for differentiating an inter-symbol hopping pattern at the time of next hopping is defined. This parameter may be transmitted through DCI or RRC signaling.

The hopping offset according to Proposal 2-1-5 may differentiate the hopping pattern at a predetermined time, thereby dispersing interference occurring at the time of hopping. As an embodiment, a parameter for differentiating the hopping pattern according to the hopping cycle is applicable.

Figure 17:
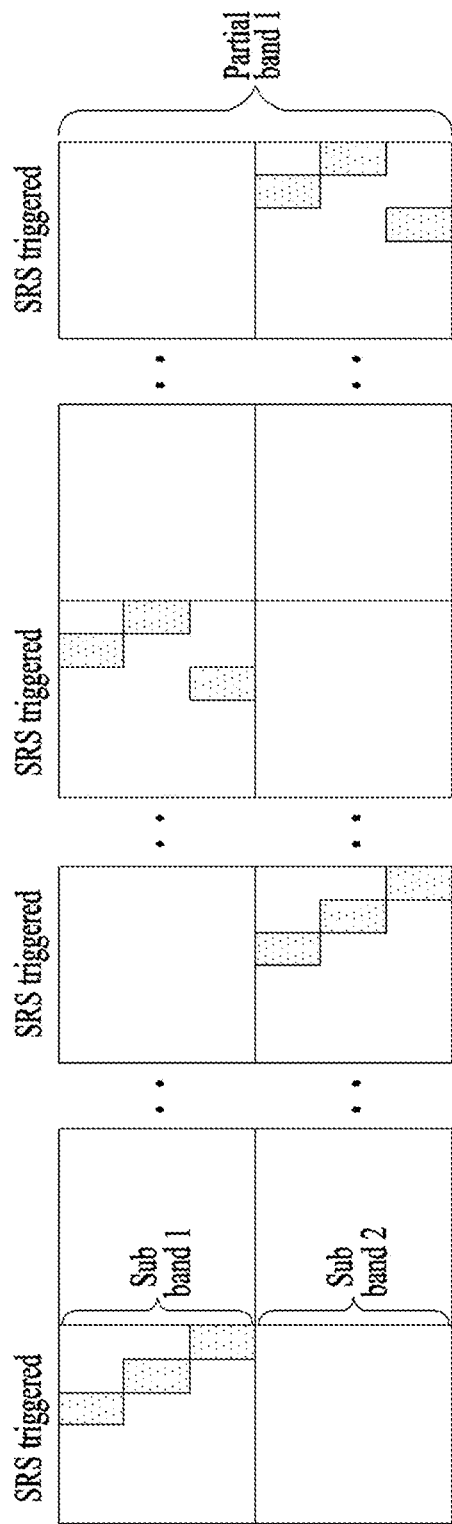
FIG. 17 is a view showing an example of applying different symbol-level hopping patterns according to hopping cycle.

FIG. 17 is a view showing an example of applying different intra-slot hopping patterns for each hopping cycle.

When considering a parameter $h_{shift}$ for changing the intra-slot hopping pattern for each hopping cycle, the BS may transmit $h_{shift}$ to the UE through DCI every hopping cycle or $h_{shift}$ is expressed according to $T_{hopping}$ in Equation 3, such that hopping is performed with intra-slot hopping pattern other than the intra-slot hopping pattern used in a previous hopping cycle as shown in FIG. 15.

When hopping cycle $T_{hopping}$=4slot, Equation 3 below is obtained.

$$n_{SRS}=(l'+h_{shift}) \bmod L', h_{shift}=\lfloor (n_f \times N_s + n_s)/T_{hopping} \rfloor \quad \text{[Equation 3]}$$

where, L' denotes the number of symbols of the SRS allocated to one SRS slot.

$T_{hopping}$ may be expressed using the length of an SRS resource allocated to one symbol, a UL BW length, $T_{SRS}$ and L'. That is, $$T_{hopping} = \frac{BW_{UL}/BW_{SRS}}{L'} \times T_{SRS}$$

Proposal 2-2-1

In the case of aperiodic SRS, the BS may configure parameters for inter-slot hopping configuration and parameters for intra-slot hopping configuration and transmit to the UE through (dedicated) RRC or MAC-CE. When the BS transmits through MAC-CE, valid period (or interval) of the hopping parameters transmitted through the MAC-CE is determined using an activation signal, a deactivation signal or a timer. Hopping may be performed whenever the SRS is dynamically triggered with a pre-defined intra-slot/inter-slot hopping pattern. In this case, overhead is also small.

Figure 18:
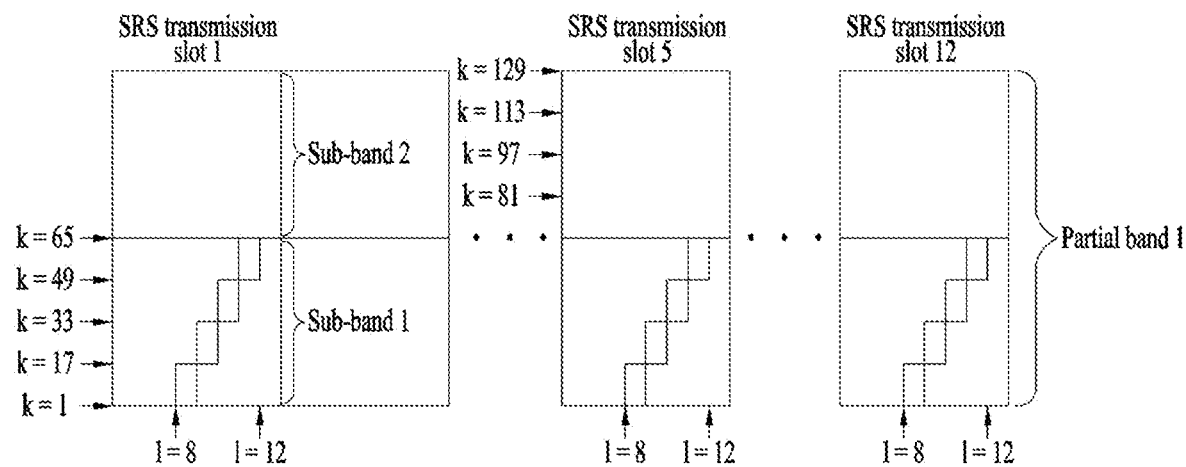
FIG. 18 is a view showing an example of applying the same symbol level hopping pattern at the time of aperiodic SRS transmission.

FIG. 18 is a view showing an example of applying same intra-slot hopping pattern at the time of aperiodic SRS transmission.

Parameters for inter-slot hopping configuration and parameters for intra-slot hopping configuration may be configured/transmitted through RRC signaling (hopping in a specific sub-band is applied).

(Dedicated) RRC signaling for inter-slot hopping configuration may indicate the SRS allocation start RB index=1, the SRS allocation end RB index=129, the sub-band index=1, and the partial band index=1. (Dedicated) RRC signaling for intra-slot hopping configuration may indicate the SRS BW=16 RBs, the number of configured SRS symbols in the SRS transmission slot=4, the configured SRS start symbol position=8, the configured SRS end symbol position=11, the sub-band index=1, the partial band index=1, and the symbol hopping cycle=4 symbols.

As shown in FIG. 18, parameters for inter-slot hopping configuration and parameters for intra-slot hopping configuration are configured/transmitted through RRC signaling, and the aperiodic SRS is triggered in SRS slot 1, SRS slot 5 and SRS slot 12. If $n_{SRS}=\alpha_1(l')$, $n_{SRS}=\alpha_1(l')$ and $n_{SRS}=\alpha_1(l')$ are configured, the symbol hopping pattern may be equally applied.

Figure 19:
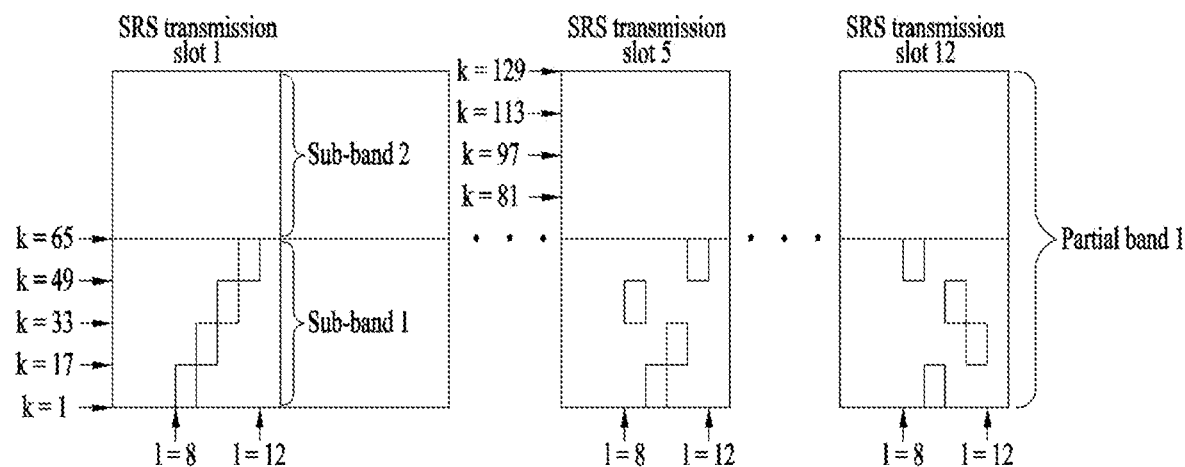
FIG. 19 is a view showing an example of applying different symbol level hopping patterns at the time of aperiodic SRS transmission.

FIG. 19 illustrates applying different intra-slot hopping patterns at the time of aperiodic SRS transmission.

If $n_{SRS}=\alpha_1(l',1)$, $n_{SRS}=\alpha_1(l',5)$ and $n_{SRS}=\alpha_1(l',12)$ are configured, as shown in FIG. 19, different intra-slot patterns may appear per slot. As another embodiment, the BS may configure/transmit parameters for inter-slot hopping configuration and parameters for intra-slot hopping configuration through RRC signaling (hopping in a partial band is applied).

Figure 20:
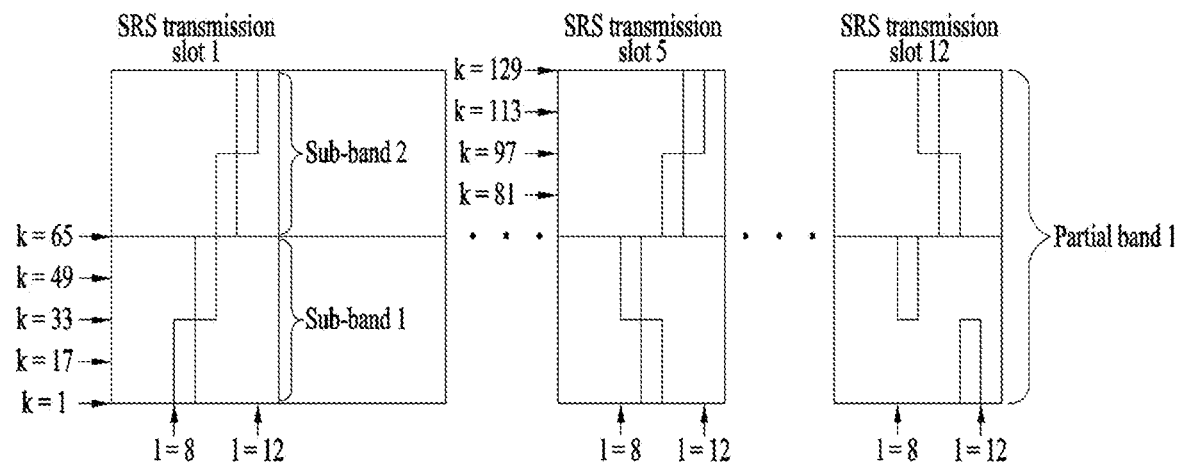
FIG. 20 is a view showing an example of applying different symbol level hopping patterns (hopping over a partial band) at the time of aperiodic SRS transmission.

FIG. 20 is a view showing an example of applying different intra-slot hopping patterns (hopping over a partial band) at the time of aperiodic SRS transmission.

(Dedicated) RRC signaling for inter-slot hopping configuration may indicate the SRS allocation start RB index=1, the SRS allocation end RB index=129, and the partial band index=1. (Dedicated) RRC signaling for intra-slot hopping configuration may indicate the SRS BW=32 RBs, the number of configured SRS symbols in the SRS transmission slot=4, the start symbol position of the configured SRS=8, the end symbol position of the configured SRS=11, the partial band index=1, and the symbol hopping cycle=4 symbols.

As shown in FIG. 20, parameters for inter-slot hopping configuration and parameters for intra-slot hopping configuration are configured/transmitted through RRC signaling and the aperiodic SRS is triggered in SRS slot 1, SRS slot 5 and SRS slot 12. If $n_{SRS}=\alpha_1(l',1)$, $n_{SRS}=\alpha_1(l',5)$ and $n_{SRS}=\alpha_1(l',12)$ are configured, different intra-slot patterns may appear per slot.

Proposal 2-2-2

In the case of the aperiodic SRS, the BS may configure/transmit parameters for inter-slot hopping configuration through (dedicated) RRC signaling and configure/transmit parameters for intra-slot hopping configuration through DCI when the SRS is triggered. In contrast, the BS may configure/transmit parameters for inter-slot hopping configuration through DCI whenever the SRS is triggered and configure/transmit parameters for intra-slot hopping configuration through (dedicated) RRC signaling.

The BS may dynamically provide information on parameters for intra-slot hopping and inter-slot hopping to the UE whenever the SRS is triggered. Of course, in this case, signaling overhead of the BS may be increased.

Figure 21:
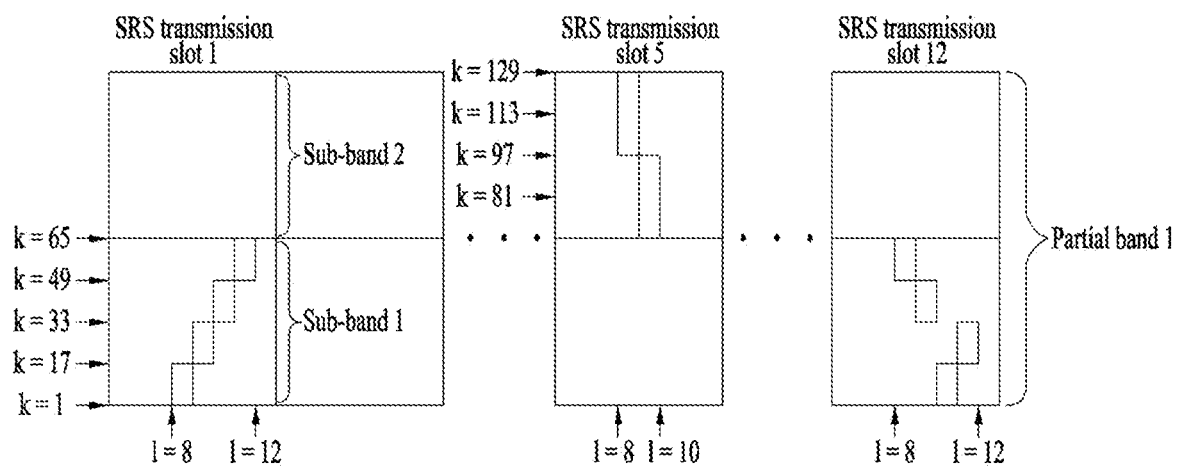
FIG. 21 is a view showing an example of applying different symbol level hopping pattern (hopping over a specific sub-band) at the time of aperiodic SRS transmission.

FIG. 21 is a view showing an example of applying different intra-slot hopping patterns (hopping over a specific sub-band) at the time of aperiodic SRS transmission. As an embodiment, in the case of the aperiodic SRS, the BS may configure/transmit parameters for inter-slot hopping configuration through (dedicated) RRC signaling and transmit parameters for intra-slot hopping configuration through DCI. In FIG. 21, the SRS is aperiodically triggered when the SRS slot positions are indices of 1, 5 and 12. The BS may transmit the following information to the UE when indicating that the aperiodic SRS is triggered. (Dedicated) RRC signaling for inter-slot hopping configuration may indicate the SRS allocation start RB index=1, the SRS allocation end RB index=129, and the partial band index=1.

As an example of transmission of DCI for intra-slot hopping configuration, the DCI for SRS slot 1 may indicate the SRS BW=16 RBs, the number of configured SRS symbols in the SRS transmission slot=4, the start symbol position of the configured SRS=8, the end symbol position of the configured SRS=11, the partial band index=1, the sub-band index in a partial band=1, and the symbol hopping cycle=4 symbols. The DCI for SRS slot 5 may indicate the SRS BW=32 RBs, the number of configured SRS symbols in the SRS transmission slot=2, the start symbol position of the configured SRS=8, the end symbol position of the configured SRS=9, the partial band index=1, the sub-band index in a partial band=2, and the symbol hopping cycle=2 symbols. The DCI for SRS slot 12 may indicate the SRS BW=16 RBs, the number of configured SRS symbols in the SRS transmission slot=4, the start symbol position of the configured SRS=8, the end symbol position of the configured SRS=11, the partial band index=1, the sub-band index in a partial band=1, and the symbol hopping cycle=4 symbols.

At this time, if a value indicating the intra-slot pattern is $n_{SRS}=\alpha_1(1',1)$, $n_{SRS}=\alpha_1(1',5)$ and $n_{SRS}=\alpha_1(1',12)$, different intra-slot patterns may be configured per slot.

Proposal 2-2-3

In the case of aperiodic SRS, the BS may configure/transmit information on a specific set of parameters for inter-slot hopping configuration and/or parameters for intra-slot hopping configuration to the UE through RRC signaling or DCI including the request field. In this case, signaling overhead may be significantly reduced.

Figure 22:
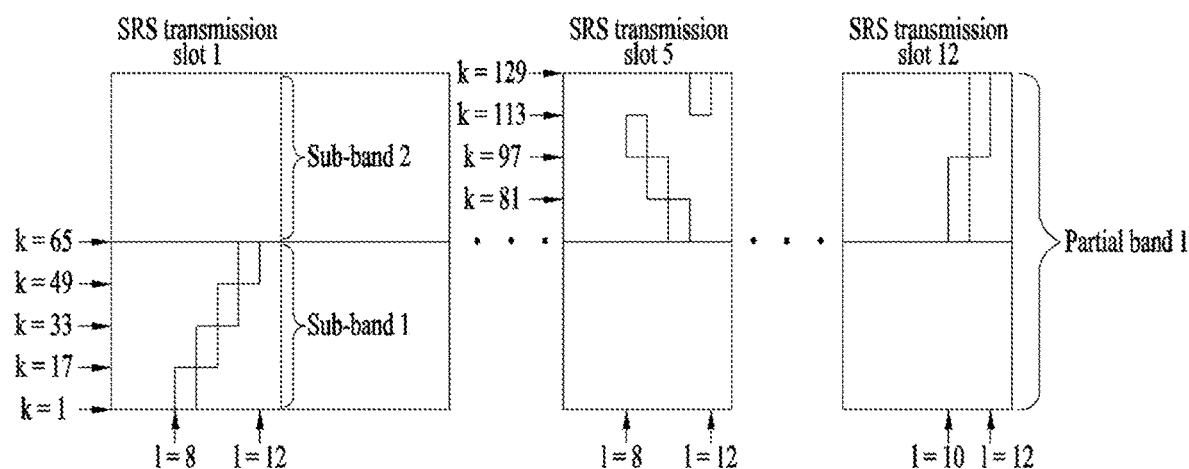
FIG. 22 illustrates SRS transmission according to request field transmission using a hopping parameter set at the time of aperiodic SRS transmission.

FIG. 22 illustrates SRS transmission according to request field transmission using a hopping parameter set at the time of aperiodic SRS transmission.

Table 12 below shows an intra-slot hopping configuration parameter set according to Proposal 2-2-3.

TABLE 12

| | Request field (in the case of symbol level hopping) | | | |
|---|---|---|---|---|
| | '00' | '01' | '10' | '11' |
| Parameter values for intra-slot hopping configuration | SRS BW = 16 RBs Number of symbols of configured SRS in SRS transmission slot = 4 configured SRS start symbol position = 8 configured SRS end symbol position = 11 partial band index = 1 sub-band index in a partial band = 1 symbol hopping cycle = 4 symbols | SRS BW = 16 RBs Number of symbols of configured SRS in SRS transmission slot = 4 configured SRS start symbol position = 8 configured SRS end symbol position = 11 partial band index = 1 sub-band index in a partial band = 2 symbol hopping cycle = 4 symbols | SRS BW = 32 RBs Number of symbols of configured SRS in SRS transmission slot = 2 configured SRS start symbol position = 8 configured SRS end symbol position = 9 partial band index = 1 sub-band index in a partial band = 1 symbol hopping cycle = 2 symbols | SRS BW = 32 RBs Number of symbols of configured SRS in SRS transmission slot = 2 configured SRS start symbol position = 10 configured SRS end symbol position = 11 partial band index = 1 sub-band index in a partial band = 2 symbol hopping cycle = 2 symbols |

As shown in FIG. 22, the periodic SRS is triggered in slot indexes which SRS slot positions are 1, 5 and 12. FIG. 22 shows the BS transmits DCI to the UE. It is illustrated that DCI indicates the request field for SRS slot 1 of "00", DCI indicates the request field for SRS slot 5 of "01" and DCI indicates the request field for SRS slot 12 of "11" from the BS to the UE.

Proposal 2-2-4

In the case of the aperiodic SRS, the BS may configure/transmit a set of an inter-slot hopping pattern through RRC signaling, and the BS may transmit an intra-slot hopping request field through DCI when aperiodic multiple SRS symbols are triggered. When the SRS is triggered, different hopping patterns may be flexibly configured between multiple SRS symbols. Table 13 below shows the symbol-level hopping request field.

TABLE 13

| | Intra-slot hopping request field | | | |
|---|---|---|---|---|
| | '00' | '01' | '10' | '11' |
| Hopping pattern function $F(i_{sb}, n_f, n_s, T_{SRS})$ | $F(0, n_f, n_s, T_{SRS})$ | $F(1, n_f, n_s, T_{SRS})$ | $F(2, n_f, n_s, T_{SRS})$ | $F(3, n_f, n_s, T_{SRS})$ |

Proposal 2-2-5

The BS may configure/transmit a set indicating a combination of an intra-slot hopping pattern set (e.g., the hopping request fields '00', '01', '10' and '11' shown in Table 13) and a sequence parameter set (e.g., TC, TC offset, CS, root, etc.) through RRC signaling and transmit, one or a plurality of request fields for applying to slot which SRS is triggered, through UL DCI. For example, Table 14 shows the request field of the sequence parameter set (e.g., TC, TC offset, CS, root, etc.) and the hopping parameter set.

TABLE 14

| Request field | '00' | '01' | '10' | '11' |
|---|---|---|---|---|
| Hopping pattern function $F(i_{sb}, n_f, n_s, T_{SRS})$ | $F(0, n_f, n_s, T_{SRS})$ | $F(1, n_f, n_s, T_{SRS})$ | $F(2, n_f, n_s, T_{SRS})$ | $F(3, n_f, n_s, T_{SRS})$ |
| Sequence parameter set index | 0 | 1 | 2 | 3 |

The UE may select hopping pattern and sequence parameter set indicated by the request field received through DCI, generate an SRS sequence and transmit an SRS.

Proposal 2-2-6 when aperiodic multiple SRS symbols are triggering, a triggering counter (N) is introduced. The BS may configure/transmit triggering counter N through DCI or RRC signaling.

Figure 23:
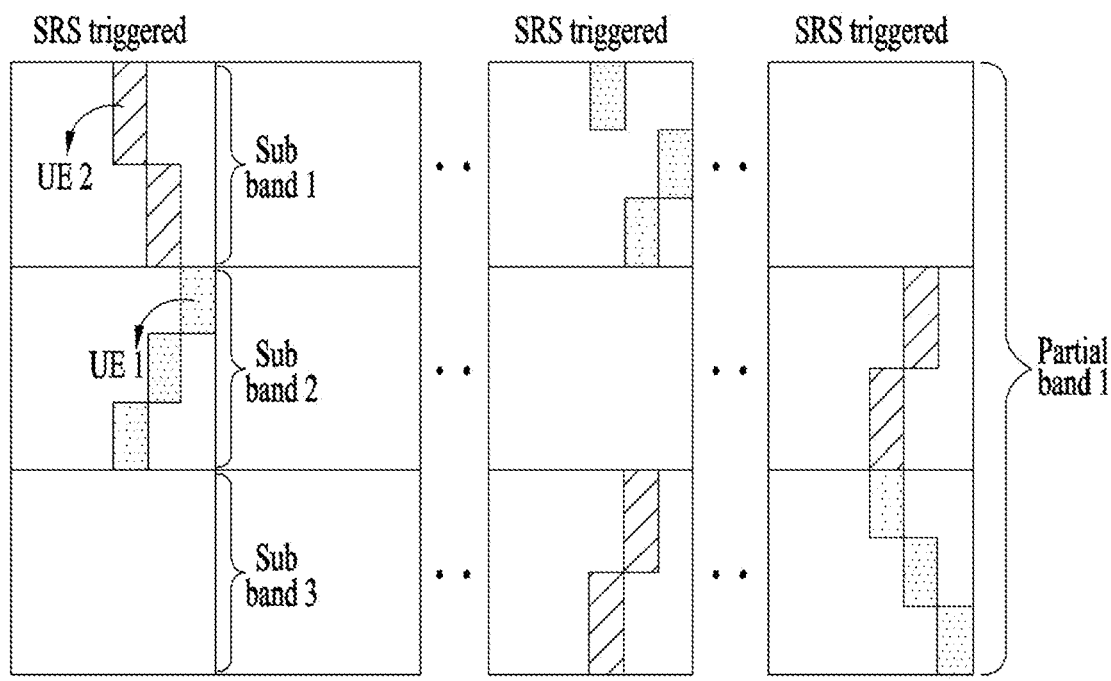
FIG. 23 illustrates hoping when triggering counter N=3.

FIG. 23 illustrates hopping when triggering counter N=3.

In $F(i_{pb}n \bmod N), n_f, n_s, T_{SRS})$, n may indicate the number of times of triggering the aperiodic multiple SRS symbols starting from a reference UL slot.

Proposal 2-3

In the case of semi-persistent SRS, for intra-slot hopping and/or inter-slot hopping, the BS may configure/transmit parameters for operations of performing hopping and finishing hopping (e.g., an SRS triggered slot index in which slot/symbol-level hopping starts, semi-persistent frequency hopping activation, an SRS triggered slot index in which slot/symbol-level hopping ends, and semi-persistent frequency hopping deactivation) to the UE through DCI or MAC-CE. A timer for hopping deactivation may operate at the time of activation.

When the semi-persistent SRS is activated and hopping is activated, parameters for hopping configuration becomes valid and, when hopping is deactivated, parameters for hopping configuration do not become valid.

Proposal 2-4

For a UE located at a cell edge in order to acquire SRS receive power, the BS may define the repetition number SRS symbol, allocate SRS resources at the same position until the repetition number and configure to perform hopping in a next SRS symbol or a next SRS slot. In this case, the BS may transmit information on the repetition number of SRS symbol to the UE through RRC signaling or UL DCI. Accordingly, the reception side (the BS) may combine the SRS symbols allocated to the same frequency resources by the repetition number FIG. 24 illustrates symbol level hopping when repetition number=2 (repetition r=2).

Figure 24:
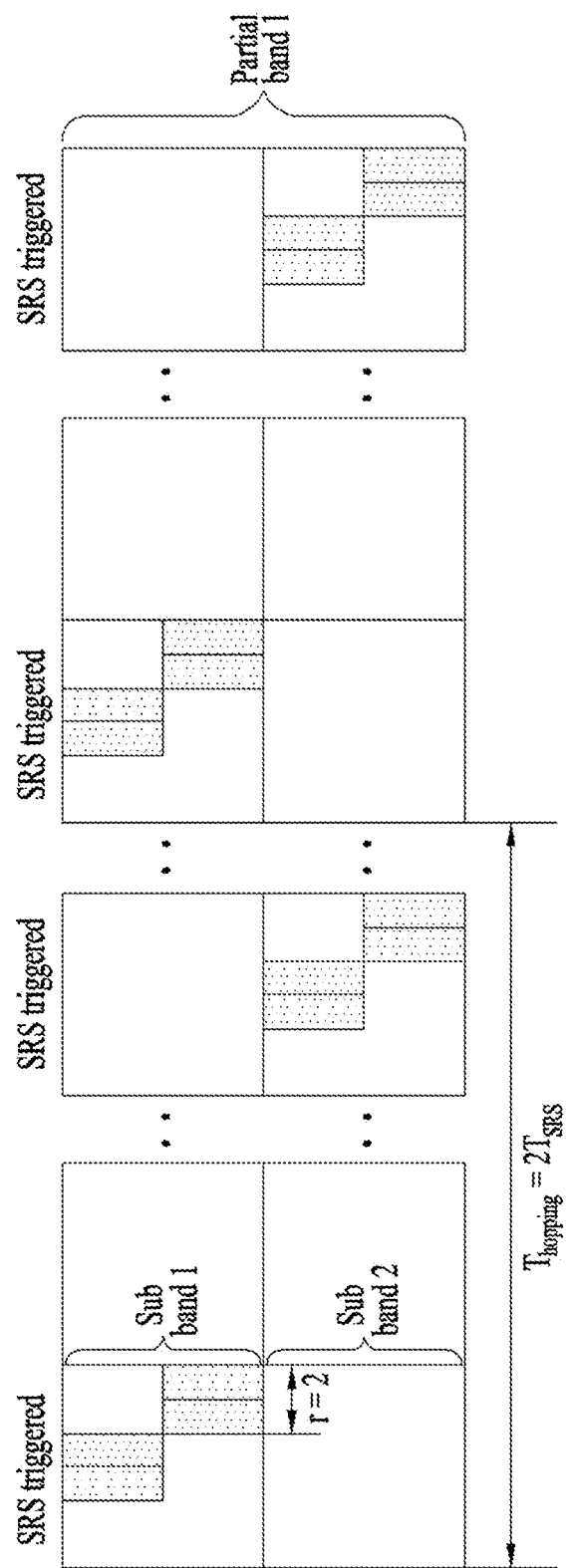
FIG. 24 illustrates symbol level hopping when repetition r=2.

As shown in FIG. 24, in the case of the repetition number (r=2) of symbol, when L'=4 and $T_{hopping}=2T_{SRS}$, in the case of the periodic SRS, $$n_{SRS} = \lfloor l'/r \rfloor + \frac{N_{SRS\_symbol}}{r} \times \lfloor (n_f \times N_s + n_s)/T_{SRS} \rfloor$$

may be expressed. $N_{SRS\_symbol}$ is the number of SRS symbols configured in the configured SRS slot. In the case of aperiodic SRS, since only configuration in one slot may be necessary, $n_{SRS}=\lfloor l'/r \rfloor$ may be expressed.

Proposal 2-4-1

The UE located at the cell edge may perform UL full-band transmission in multiple symbols configured to acquire SRS receive power. In this case, the sequence parameters, the precoding vectors mapped to the SRS resources and the ports may be equally applied.

Proposal 2-5

It is possible to support SRS hopping through a single hopping configuration integrating intra-slot configuration and/or inter-slot hopping configuration. At this time, the parameters may be as follows.

When information on the parameters for the single hopping configuration includes SRS resource position information: The information on the parameters for the single hopping configuration may include information on a value indicating the SRS resource allocation position in each symbol starting from a hopping enable symbol (e.g., RIV (resource indication value), RE/RB index, sub-band index, and partial band index), the number of configured SRS symbols in the SRS transmission slot and index, the intra-slot hopping cycle, the inter-slot hopping cycle, a hopping enable flag indicating whether hopping is enabled, etc.

When the hopping pattern is used, the information on the parameters for the single hopping configuration may include the number of configured SRS symbols in the SRS transmission slot and the index, the symbol-level hopping cycle, the slot-level hopping cycle, the intra-slot and/or inter-slot hopping pattern, the hopping enable flag, etc.

Figure 25:
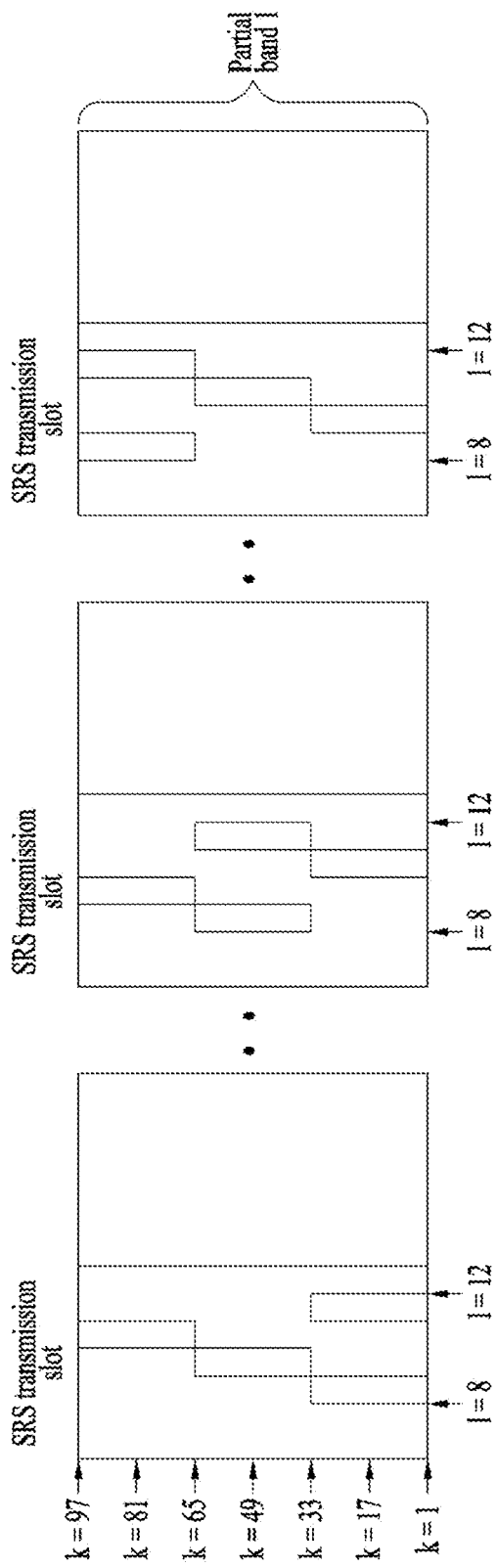
FIG. 25 illustrates a hopping pattern according to the number of symbols of an SRS.

FIG. 25 illustrates a hopping pattern according to the number of SRS symbol.

As an embodiment, the case of using the hopping pattern will be described.

Example of (Dedicated) RRC Signaling for Frequency Hopping Configuration (Dedicated) RRC signaling for frequency hopping configuration may include the SRS BW=32 RBs, the number of configured SRS symbols in the SRS transmission slot ($N_{SRS\_symbol}$)=4, the start symbol position (or the index) of the configured SRS=8, the end symbol position (or the index) of the configured SRS=11, the partial band index=1, the symbol hopping cycle $T_{symbol\_hopping}=3$ symbols, and the slot hopping cycle $T_{slot\_hopping}=T_{SRS}$ slots. When $n_{SRS}=\lfloor (l'+N_{SRS\_symbol}\times\lfloor(n_f\times N_s+n_s)/T_{SRS}\rfloor)$ mod $T_{symbol\_hopping}\rfloor$ is configured (here, $n_{SRS}$ is a hopping interval in the time domain), as shown in FIG. 25, the hopping pattern may not be changed according to SRS slot but may be formed according to the number of the SRS symbols.

Figure 26:
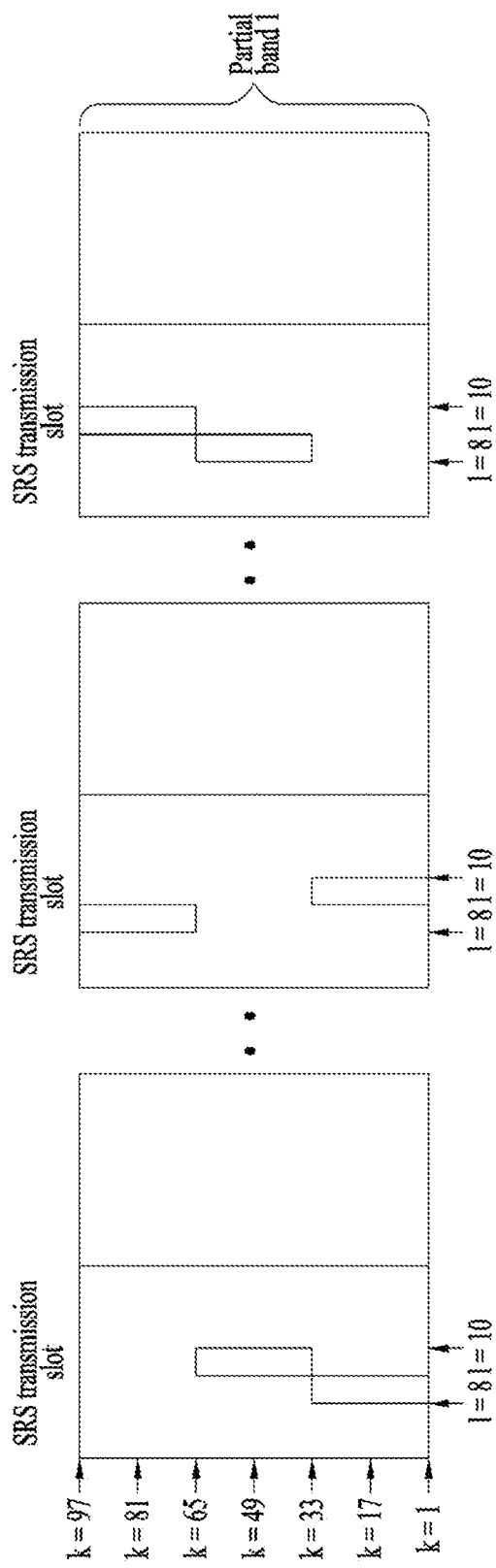
FIG. 26 illustrates a hopping pattern according to the number of symbols of an SRS (when the number of symbols of the SRS in an SRS slot is less than a symbol hopping cycle)

FIG. 26 illustrates hopping pattern according to the number of SRS symbols (when the number of the SRS symbols in an SRS slot is less than a symbol hopping cycle).

As another embodiment, the case of using the hopping pattern will be described. In the example of FIG. 25, hopping is easily applicable even when the number of symbols in one SRS slot is less than the symbol hopping cycle.

Example of (Dedicated) RRC for Frequency Hopping Configuration (Dedicated) RRC signaling for frequency hopping configuration may include information on system bandwidth (SRS BW=32 RBs), the number of configured SRS symbols in the SRS transmission slot ($N_{SRS\_symbol}$)=2, the start symbol position (or the index) of the configured SRS=8, the end symbol position (or the index) of the configured SRS=9, the partial band index=1, the symbol hopping cycle $T_{symbol\_hopping}=3$ symbols, and the slot hopping cycle $T_{slot\_hopping}=2T_{SRS}$ slots. The hopping interval in the time domain $n_{SRS}$ may be configured as $n_{SRS}=\lfloor(l'+N_{SRS\_symbol}\times\lfloor(n_f\times N_s+n_s)/T_{SRS}\rfloor)$ mod $T_{symbol\_hopping}\rfloor$.

Proposal 3

If symbol-level hopping is configured in the periodic/aperiodic/semi-persistent SRS, RRC configuration of the hopping pattern parameter and DCI configuration of the SRS resource position information may be performed by one of the following operations in order to support hopping between the partial bands.

The symbol-level hopping pattern parameters including the partial band index may be configured/transmitted through RRC signaling. The BS may configure/transmit the partial band index through DCI whenever multiple SRS symbols are transmitted and configure/transmit symbol-level hopping pattern parameters through RRC signaling. The partial band index may be replaced with other information indicating the frequency position for designating the partial band (e.g., RIV indicating the partial band position and range, partial band start RE/RB, and end RE/RB).

Figure 27:
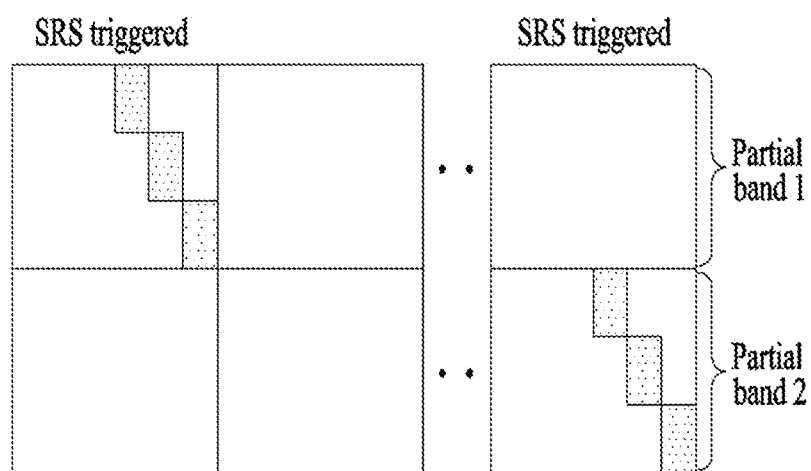
FIG. 27 is a view showing description of Case 1-1.

FIG. 27 is a view showing description of Case 1-1.

Case 1: A hopping pattern between SRS symbols is applied in one partial band and hopping to another partial band is performed in a next SRS triggered slot. As Case 1-1, as shown in FIG. 27, the hopping pattern between symbols in the next SRS triggered slot may be equal to the previous hopping pattern.

As an embodiment, the symbol-level hopping pattern configuration including the partial band index will be described.

In NR, when the number of slots in one frame $n_f$ is $N_s$, the index of each slot is $n_s$, and l' is the symbol index of the configured SRS, $n_{SRS}$ for hopping may be configured as shown in Equation 4 below.

$$n_{SRS} = l',$$

$$k_0^{(p)} = \bar{k}_0^{(p)} + F(i_{pb}, n_f, n_s, T_{SRS}) + \sum_{b=0}^{B_{SRS}} {}^{`}K_{TC}M_{sc,b}^{RS}n_b,$$

[Equation 4]

where, $F(i_{pb}, n_f, n_s, T_{SRS})$ is a hopping position function according to the partial band index $i_{pb}$. $B_{SRS}$ spans on one partial band. $F(i_{pb}, n_f, n_s, T_{SRS})=(i_{pb}(n_f, n_s, T_{SRS})-1)\times BW_{pb}$. $BW_{pb}$ is the number of REs indicating the bandwidth of the partial band. $i_{pb}(n_f, n_s, T_{SRS})=c(n_f, n_s, T_{SRS}) \mod I_{pb}$. $I_{pb}$ is a total number of partial bands. c( ) is a scrambling function.

As another embodiment, transmission of the partial band index by the BS through DCI and the symbol-level hopping pattern will be described.

In Equation 4 above, $i_{pb}$ is transmitted by the BS through DCI in each slot, in which the SRS is transmitted, and the $F(i_{pb}, n_f, n_s, T_{SRS})$ value is configured using $i_{pb}$.

Figure 28:
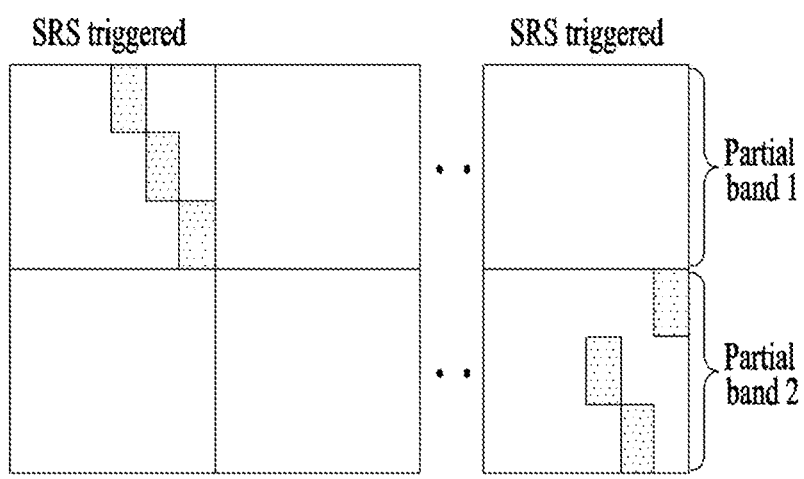
FIG. 28 is a view showing description of Case 1-2.

FIG. 28 is a view showing description of Case 1-2.

Case 1-2: The information on the hopping pattern may include a value indicating the partial band index or the partial band (RB and/or RE of the partial band), and the BS may configure the information on the hopping pattern in a UE-specific manner. As an embodiment, the symbol-level hopping pattern configuration including the partial band index of FIG. 28 may be expressed as shown in Equation 5 below.

$$n_{SRS} = l' + N_{SRS\_symbol} \times \lfloor (n_f \times N_s + n_s)/T_{SRS} \rfloor, \quad \text{[Equation 5]}$$

$$k_0^{(p)} = \bar{k}_0^{(p)} + F(i_{pb}, n_f, n_s, T_{SRS}) + \sum_{b=0}^{B_{SRS}} {}^\cdot K_{TC} M_{sc,b}^{RS} n_b,$$

where, $B_{SRS}$ spans on one partial band.

The following may be considered in consideration of a repetition symbol.

$$n_{SRS} = \lfloor l'/r \rfloor + N_{SRS\_symbol}/r \times \lfloor (n_f \times N_s + n_s)/T_{SRS} \rfloor,$$

$$k_0^{(p)} = \bar{k}_0^{(p)} + F(i_{pb}, n_f, n_s, T_{SRS}) + \sum_{b=0}^{B_{SRS}} {}^\cdot K_{TC} M_{sc,b}^{RS} n_b$$

Figure 29:
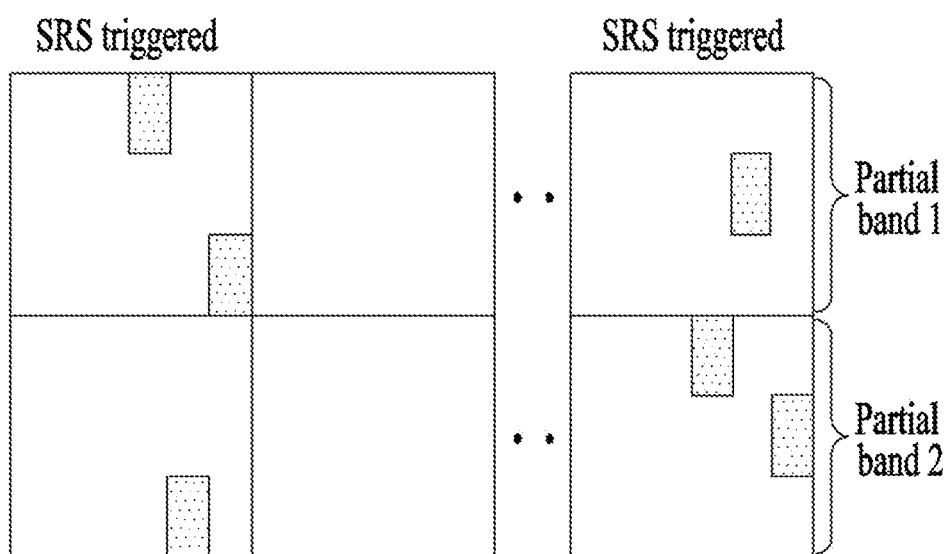
FIG. 29 is a view showing description of Case 2.

FIG. 29 is a view showing description of Case 2.

As Case 2, as shown in FIG. 29, the hopping pattern irrelevant to the partial band in the slot in which multiple SRS symbols are configured is applicable.

As an embodiment, an example of the hopping pattern irrelevant to the partial band in the slot in which multiple SRS symbols are configured may be expressed as shown in Equation 6 below.

$$n_{SRS} = l' + N_{SRS\_symbol} \times \lfloor (n_f \times N_s + n_s/T_{SRS} \rfloor, \quad \text{[Equation 6]}$$

$$n_b = \{n_b + F_b(n_{SRS})\} \mod N_b$$

where, $B_{SRS}$ spans full UL BW.

The following may be considered in consideration of a repetition symbol.

$$n_{SRS} = \lfloor l'/r \rfloor + {}^{N_{SRS\_symbol}/}r \times \lfloor (n_f \times N_s + n_s)/T_{SRS} \rfloor,$$

$$n_b = \{n_b + F_b(n_{SRS})\} \mod N_b$$

FIG. 30 is a view showing description of Case 3.

As Case 3, frequency hopping between the partial bands may be disallowed. (a) of FIG. 30 shows a fixed intra-slot hopping pattern and (b) of FIG. 30 shows another inter-slot hopping pattern. $B_{SRS}$ may be configured to span on the partial band.

Proposal 4

A method of transmitting information on parameters for inter-slot frequency hopping configuration supporting hopping between partial bands in a periodic/aperiodic/semi-persistent SRS is proposed.

Proposal 4-1

The BS may configure/transmit information on the SRS frequency resource position, the number of the SRS symbols in SRS-triggered slot, the SRS symbol position and the position of the transmitted partial band to the UE through RRC signaling (e.g., UE dedicated RRC signaling).

Figure 31:
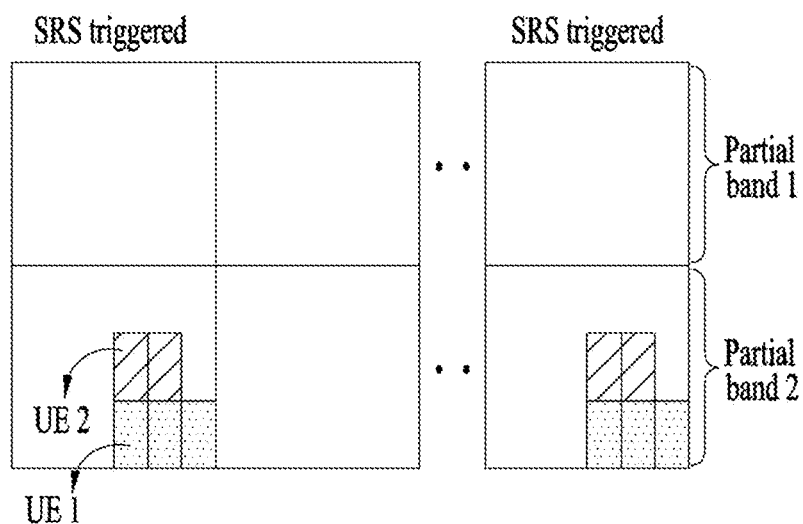
FIG. 31 is a view showing configuration of a fixed SRS resource position at the time of periodic/aperiodic SRS transmission.

FIG. 31 is a view showing configuration of a fixed SRS resource position at the time of periodic/aperiodic SRS transmission.

The structure of FIG. 31 is possible when only inter-slot hopping in a specific partial band is supported and can improve SRS reception performance through energy combining of the continuously concatenated SRS symbols.

Proposal 4-2

The BS may configure/transmit information on the SRS frequency resource position, the number of the SRS symbols in the SRS-triggered slot and the SRS symbol position through RRC signaling (e.g., UE dedicated RRC signaling) and configure/transmit the transmitted partial band position through DCI.

Proposal 4-3

The BS may configure/transmit information on the SRS frequency resource position, the number of the SRS symbols in the SRS-triggered slot and the SRS symbol position through RRC signaling (e.g., UE dedicated RRC signaling) and configure the transmitted partial band position using the inter-slot hopping pattern.

Figure 32:
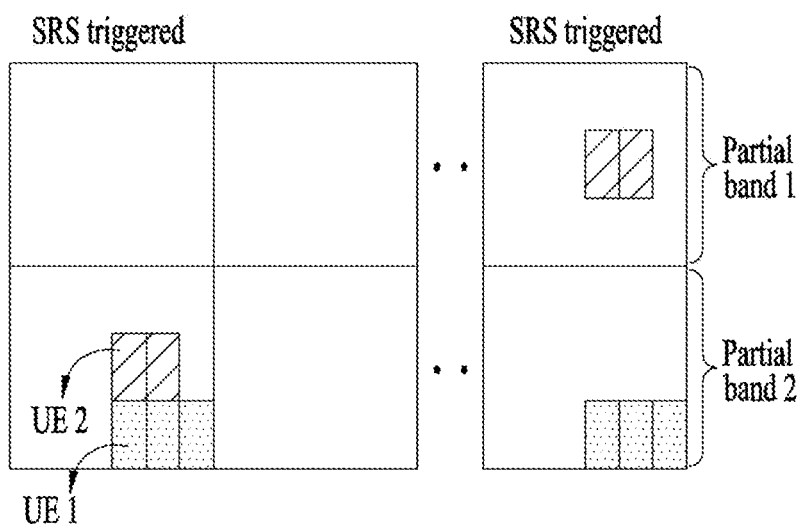
FIG. 32 is a view showing configuration of hopping between partial bands at the time of periodic/aperiodic triggering.

FIG. 32 is a view showing configuration of hopping between partial bands at the time of periodic/aperiodic triggering.

As shown in FIG. 32, the partial band position may be dynamically changed. As an embodiment, an example of the inter-slot hopping pattern (an example of hopping between partial bands) may be expressed as shown in Equation 7 below.

$$n_{SRS} = \lfloor N_{SRS\_symbol} \times (\lfloor n_f \times N_s + n_s \rfloor/T_{SRS}) \rfloor, \quad \text{[Equation 7]}$$

$$i_{pb}(n_{SRS}) = c(n_{SRS}) \mod I_{pb}$$

In consideration of a repetition symbol, $$n_{SRS} \lfloor N_{SRS\_symbol}/r \times (\lfloor n_f \times N_s + n_s \rfloor/T_{SRS}) \rfloor,$$

$$i_{pb}(n_{SRS}) = c(n_{SRS}) \mod I_{pb}$$

may be expressed.

Proposal 4-4

The BS may configure/transmit information on the SRS frequency resource position through (dedicated) RRC signaling and configure/transmit information on the number of SRS symbols and the partial band position through DCI.

Proposal 4-5

The BS may configure/transmit information on the SRS frequency resource position through (dedicated) RRC signaling and configure information on the number of SRS symbols and the partial band position using the inter-slot hopping pattern.

Figure 33:
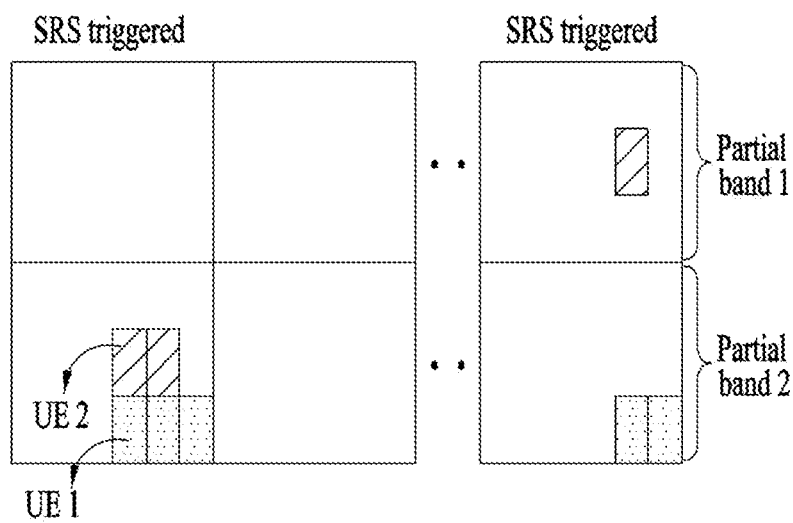
FIG. 33 is a view showing configuration of hopping between partial bands at the time of periodic/aperiodic triggering.

FIG. 33 is a view showing configuration of hopping between partial bands at the time of periodic/aperiodic triggering.

As shown in FIG. 33, a structure for flexibly supporting partial band hopping at the time of SRS transmission and configuring the number of SRS symbols in the inter-slot hopping parameter configuration may be considered.

Proposal 4-6

The BS configures/transmits information on the number of SRS symbols and the partial band position through (dedicated) RRC signaling and configures/transmits information on the SRS frequency resource position (e.g., RIV) through DCI.

Proposal 4-7

The BS may configure/transmit information on the number of SRS symbols and the partial band position through (dedicated) RRC signaling and configure information on the SRS frequency resource position using the inter-slot hopping pattern.

Figure 34:
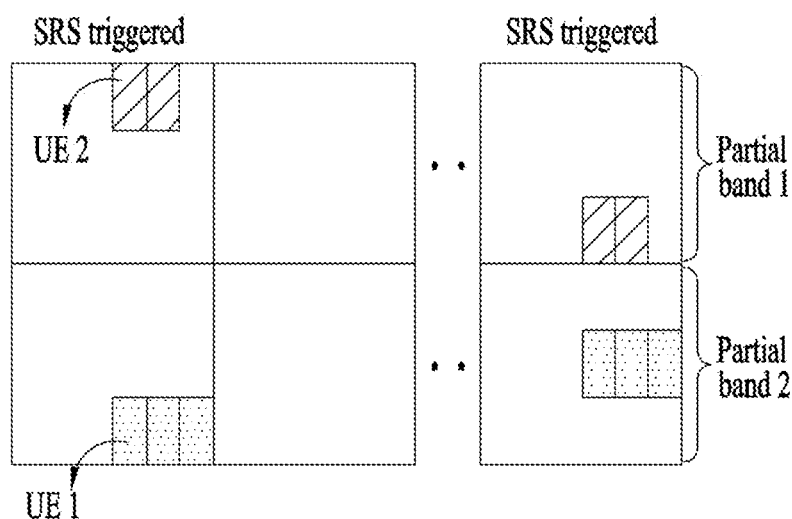
FIG. 34 is a view showing an example of changing an SRS resource position at the time of periodic/aperiodic triggering (a partial band is fixed)

FIG. 34 is a view showing an example of changing an SRS resource position at the time of periodic/aperiodic triggering (a partial band is fixed). As shown in FIG. 34, a structure for prohibiting hopping between partial bands but allowing inter-slot hopping in one partial band is also possible.

Proposal 4-8

The BS configures/transmits information on the number of SRS symbols through (dedicated) RRC signaling and configures/transmits information on and the partial band position and the SRS frequency resource position (e.g., RIV) through DCI.

Proposal 4-9

The BS configures/transmits information on the number of SRS symbols through (dedicated) RRC signaling and configures information on and the partial band position using the inter-slot hopping pattern. The BS configures/transmits information on the SRS frequency resource position (e.g., RIV) through DCI.

Proposal 4-10

The BS configures/transmits information on the number of SRS symbols through (dedicated) RRC signaling and configures information on and the partial band position and the SRS frequency resource position (e.g., RIV) using the inter-slot hopping pattern.

Figure 35:
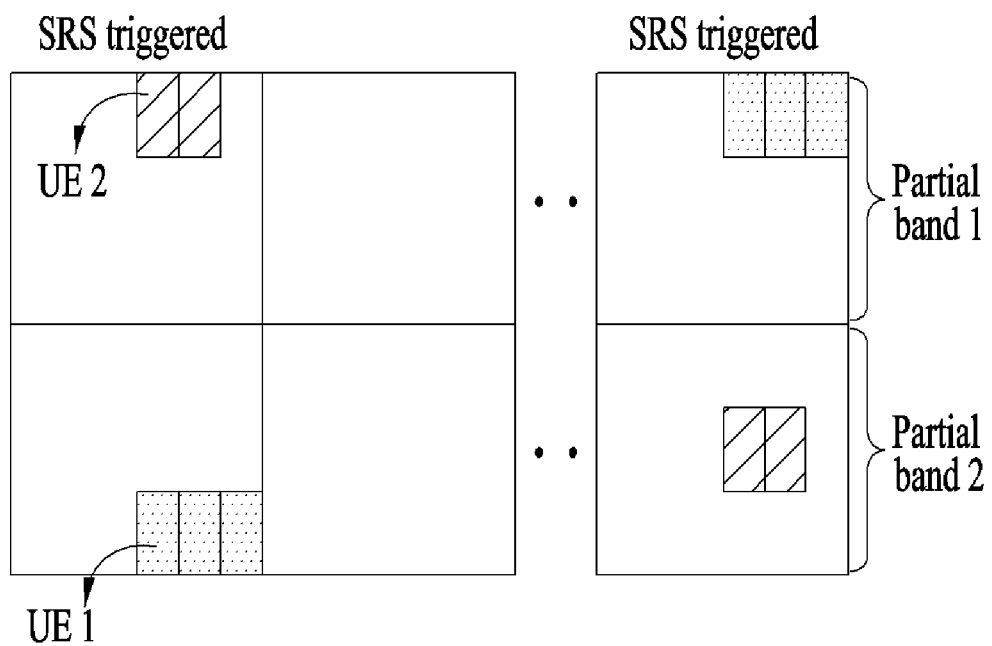
FIG. 35 is a view showing an example of changing an SRS resource position at the time of periodic/aperiodic triggering (a partial band is variable)

FIG. 35 is a view showing an example of changing an SRS resource position at the time of periodic/aperiodic triggering (a partial band is variable).

FIG. 35 shows a configuration for allowing partial band hopping between SRS slots while the number of SRS symbols in the slot between UEs is fixed (that is, the number of energy combining symbols is fixed according to a received signal difference according to a distance between the UE and the BS).

Proposal 5

For uplink resource allocation of the UL full band or UL SRS partial band of the UEs each having a narrow band RF, a predetermined number of symbols (n symbols) of the configured SRS symbols is emptied to apply a retuning time at the time of intra-slot hopping. However, n is less than the number L' of symbols of the configured SRS. Since the n value may be determined according to retuning delay of the UEs each having a narrow band RF, the UEs each having the narrow band RF may report the retuning delay value to the BS. The BS may indicate to the UE how many SRS symbols are emptied at which position in all the SRS symbols, based on the report.

Proposal 5-1

The BS may configure/transmit information on the position of the empty symbol in the configured SRS slot through cell-specific RRC signaling.

The BS may collectively empty the specific SRS symbol without the RF capability report from the UEs and the emptied symbols may be used for other uplink channels. Accordingly, symbol-level hopping may be basically configured to be performed in the localized resource SRS at the emptied symbol boundary.

Proposal 5-2

The BS may configure/transmit the position of the empty symbol in the configured SRS slot through UE-dedicated RRC signaling.

Proposal 5-3

The BS may start emptying at an emptying start position $l_0'$ within the symbol $l' \le L'$ configured for the position of the empty symbol in the configured SRS slot and transmit the symbol index $l_1'$ for transmission of the SRS symbol to the UE again. At this time, a relationship of $l_0' \le l_1' \le L'$ is satisfied.

Proposal 5-4

The RF capability (the transmission RF degree covering the full or partial UL band and/or the RF retuning degree) of the UE may be reported to the BS. The BS may transmit the position of empty symbols, the number of empty symbols, and the number of configured SRS symbols to the UE through RRC, MAC-CE or DCI in a UE-specific manner according to the intra-slot hopping pattern when multi-SRS symbols are triggered (periodic/aperiodic/semi-persistent).

Figure 36:
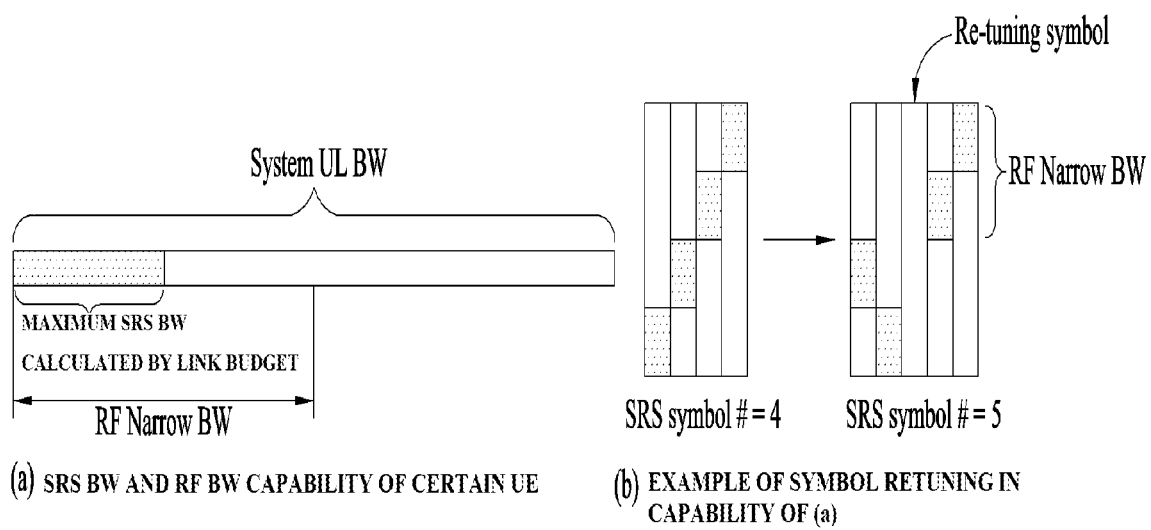
FIG. 36 is a view showing a symbol level hopping pattern considering RF retuning of a UE having narrow band RF capability.

FIG. 36 is a view showing an intra-slot hopping pattern considering RF retuning of a UE having narrow band RF capability.

(a) of FIG. 36 shows the SRS BW and RF BW capability of a specific UE and (b) of FIG. 36 shows 1-symbol retuning in the capability of (a) of FIG. 36.

The present invention proposes a configuration and method for enabling UEs (e.g., cell-edge UEs), which cannot perform UL full-band transmission due to limitation of UE's link budget, to perform UL full-band sounding while subband sounding hops on multiple symbols or multiple slots if UL full-band sounding is requested at the time of NR SRS transmission. Such an SRS hopping configuration and method may be used not only for uplink resource allocation but also for uplink beam management. The present invention proposes an SRS hopping configuration method considering RF retuning in order to support hopping of NR UEs having narrow band RF capability.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of transmitting an SRS and a UE therefor are industrially applicable to various wireless communication systems such as a 3GPP LTE/LTE-A system, a 5G communication system, etc.

The invention claimed is:

1. A method for transmitting a sounding reference signal (SRS) by a user equipment, the method comprising:
receiving first information on a number of symbols configured for transmission of the SRS and second information on a repetition number of symbols configured for transmission of the SRS; and
transmitting the SRS in a slot based on the first information and the second information,
wherein when the number of symbols configured for transmission of the SRS in the slot is L and the repetition number of symbols configured for transmission of the SRS in the slot is R,
the SRS is repeatedly transmitted on each symbol of a first R contiguous symbols in a first frequency resource, and
the SRS is repeatedly transmitted on each symbol of a second R contiguous symbols in a second frequency resource,
wherein the L symbols are contiguous and L=2*R.

2. The method according to claim 1, wherein the first two contiguous symbols are not overlapped with the second two contiguous symbols in a time domain.

3. The method according to claim 1, wherein the first frequency resource is not overlapped with the second frequency resource in a frequency domain.

4. The method according to claim 1, wherein the first information and the second information are received through a radio resource control (RRC) signaling.

5. The method according to claim 1, further comprising:
receiving parameters related to a frequency hopping,
wherein the SRS is transmitted based on the parameters.

6. The method according to claim 5, wherein the parameters related to the frequency hopping comprise information on a bandwidth of the SRS.

7. A user equipment for transmitting a sounding reference signal (SRS), the user equipment comprising:
a receiver;
a transmitter; and
a processor configured to control:
the receiver to receive first information on a number of symbols configured for transmission of the SRS and second information on a repetition number of symbols configured for transmission of the SRS; and
the transmitter to transmit the SRS in a slot based on the first information and the second information,
wherein when the number of symbols configured for transmission of the SRS in the slot is L and the repetition number of symbols configured for transmission of the SRS in the slot is R,
the transmitter to transmit repeatedly the SRS on each symbol of a first R contiguous symbols in a first frequency resource, and
the transmitter to transmit repeatedly the SRS on each symbol of a second R contiguous symbols in a second frequency resource,
wherein the L symbols are contiguous and L=2*R.

8. The user equipment according to claim 7, wherein the first two contiguous symbols are not overlapped with the second two contiguous symbols in a time domain.

9. The user equipment according to claim 7, wherein the first frequency resource is not overlapped with the second frequency resource in a frequency domain.

10. The user equipment according to claim 7, wherein the first information and the second information are received through a radio resource control (RRC) signaling.

11. The user equipment according to claim 7, wherein the processor is further configured to control:
the receiver to receive parameters related to a frequency hopping, and
the transmitter to transmit the SRS based on the parameters.

12. The user equipment according to claim 11, wherein the parameters related to the frequency hopping comprise information on a bandwidth of the SRS.

* * * * *